United States Patent
Urushibara et al.

(10) Patent No.: US 11,156,767 B2
(45) Date of Patent: Oct. 26, 2021

(54) OPTICAL FIBER AND OPTICAL TRANSMISSION SYSTEM

(71) Applicant: NIPPON TELEGRAPH AND TELEPHONE CORPORATION, Tokyo (JP)

(72) Inventors: Azusa Urushibara, Tsukuba (JP); Taiji Sakamoto, Tsukuba (JP); Masaki Wada, Tsukuba (JP); Takashi Yamamoto, Tsukuba (JP); Kazuhide Nakajima, Tsukuba (JP); Takayoshi Mori, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/633,424

(22) PCT Filed: Jul. 31, 2018

(86) PCT No.: PCT/JP2018/028663
§ 371 (c)(1),
(2) Date: Jan. 23, 2020

(87) PCT Pub. No.: WO2019/026906
PCT Pub. Date: Feb. 7, 2019

(65) Prior Publication Data
US 2020/0225407 A1    Jul. 16, 2020

(30) Foreign Application Priority Data
Aug. 1, 2017    (JP) .............................. JP2017-149494

(51) Int. Cl.
*G02B 6/02* (2006.01)
*H01S 3/10* (2006.01)
*H04B 10/2581* (2013.01)

(52) U.S. Cl.
CPC ...... *G02B 6/02323* (2013.01); *H01S 3/10007* (2013.01); *H04B 10/2581* (2013.01)

(58) Field of Classification Search
None
See application file for complete search history.

(56) References Cited

U.S. PATENT DOCUMENTS 6,418,256 B1    7/2002    Danziger et al.
2004/0047551 A1    3/2004    Ramachandran
(Continued)

FOREIGN PATENT DOCUMENTS

EP    3460542 A1    3/2019
JP    S63019929 A    1/1988
(Continued)

OTHER PUBLICATIONS

S. Ö. Arik, et. al., "Effect of mode coupling on signal processing complexity in modedivision multiplexing," J. Lightwave Technol. vol. 31 (3), (2013), pp. 423-431.
(Continued)

*Primary Examiner* — Jerry Rahll
(74) *Attorney, Agent, or Firm* — Harness, Dickey & Pierce, P.L.C.

(57) ABSTRACT

The optical fiber of the present invention includes a core, and a cladding that is provided on an outer periphery of the core and has a refractive index lower than a refractive index of the core region. In the optical fiber of the present invention, a V value representing a normalized frequency of an $LP_{02}$ mode is greater than or equal to 4.8 and less than or equal to 6.4.

11 Claims, 16 Drawing Sheets

(56) References Cited

U.S. PATENT DOCUMENTS

| | | | |
|---|---|---|---|
| 2006/0103919 A1* | 5/2006 | DiGiovanni | G02B 6/02023 359/341.5 |
| 2010/0002992 A1 | 1/2010 | Ramachandran | |

FOREIGN PATENT DOCUMENTS

| | | |
|---|---|---|
| JP | 2004-104782 A | 4/2004 |
| JP | 2013214852 A | 10/2013 |
| JP | 2014517343 A | 7/2014 |
| JP | 2014530374 A | 11/2014 |
| JP | 2015026742 A | 2/2015 |
| WO | WO-2012/158667 A1 | 11/2012 |
| WO | WO-2013/039751 A1 | 3/2013 |
| WO | WO-2018/008635 A1 | 1/2018 |

OTHER PUBLICATIONS

P. Genevaux, et. al., "6-mode Spatial Multiplexer with Low Loss and High Selectivity for Transmission over Few Mode Fiber," OFC 2015, paper W1A.5.

C. Simonneau, et. al., "5-mode Amplifier with Low Modal Crosstalk for Spatial Mode Multiplexing Transmission with Low Signal Processing Complexity," ECOC 2015, paper We.2.4.2.

P. Sillard, et. al., "Few-Mode Fiber for Uncoupled Mode-Division Multiplexing Transmissions," ECOC 2011, paper Tu.5.LeCervin.7.

S. Makovejs, et. al., "Record-Low (0.1460dB/km) Attenuation Ultra-Large Aeff Optical Fiber for Submarine Applications," OFC 2015, Post Deadline Papers, paper Th5A.2.

Y. Tamura, et. al., "Lowest-Ever 0.1419-dB/km Loss Optical Fiber," OFC 2017, paper Th5D.1.

A. A. Amin, et. al., "Dual-LP11 mode 4×4 MIMO-OFDM transmission over a twomode fiber," Opt. Exp. vol. 19 (17), (2011), pp. 16672-16679.

Y. Kato, et. al., "Effective Cutoff Wavelength of the LP11 Mode in Single-Mode Fiber Cables," IEEE Journal of Quantum Electronics, QE-17 (1), (1981), pp. 35-39.

Mori, Takayoshi et al., "Study on selective mode utilization in the large effective area few-mode fiber", IEICE technical report, Nov. 3, 2016, vol. 116, No. 294, pp. 43-48.

International Search Report regarding PCT/JP2018/028663, dated Oct. 30, 2018; ISA/JP.

* cited by examiner

OPTICAL FIBER AND OPTICAL TRANSMISSION SYSTEM

CROSS-REFERENCE TO RELATED APPLICATIONS

This application is a 371 U.S. National Phase of International Application No. PCT/JP2018/028663, filed on Jul. 31, 2018, which claims priority to Japanese Application No. 2017-149494, filed Aug. 1, 2017. The entire disclosures of the above applications are incorporated herein by reference.

The present invention relates to an optical fiber through which a plurality of propagation modes propagate, and an optical transmission system using the optical fiber as a transmission line.

BACKGROUND ART

In recent years, a few-mode fiber using a plurality of propagation modes has been proposed as a technique for expanding the transmission capacity of a communication network. Hereinafter, the propagation mode may be simply referred to as a mode. Since mode multiplexed transmission using a plurality of propagation modes can increase the transmission capacity in accordance with the number of propagation modes, mode multiplexed transmission is attracting attention as a new large-capacity transmission system.

In transmission using a few-mode fiber, crosstalk between modes occurs in the transmission line. As a method for compensating for crosstalk between modes, for example, a method using Multiple-Input Multiple-Output (MIMO) at the reception end is known. However, when the group delay difference (Differential Mode Delay (DMD)) between the modes at the reception end increases, the load of Digital Signal Processing (DSP) related to MIMO increases. For example, as disclosed in Non-Patent Document 1, it is required to reduce the load of the DSP in order to realize long-distance transmission.

In order to mitigate the influence of DMD on the DSP, an optical transmission system including a mode multiplexer and a mode demultiplexer with a high mode extinction ratio, and an optical fiber transmission line in which coupling between modes is suppressed as much as possible has been proposed in Non-Patent Documents 2 and 3. For example, in Reference 1 described later, a step-index optical fiber for suppressing coupling between modes is proposed. By using the mode multiplexer and the mode demultiplexer with a high mode extinction ratio and the optical fiber transmission line in which coupling between modes is suppressed, it is possible to suppress compensation for crosstalk between modes due to DSP in a MIMO at the reception end. By using the mode multiplexer and the mode demultiplexer with a high mode extinction ratio and the optical fiber transmission line in which coupling between modes is suppressed, it is possible to restore signals with the same level of the load of the DSP as in the optical transmission system including a single-mode fiber in the related art as a transmission line.

"Single-mode fiber" described in the present specification represent an optical fiber in which light having a wavelength used in an optical transmission system propagates in a single mode. "Multi-mode fiber" or "Few-mode fiber" described in the present specification represent an optical fiber in which light having a wavelength used in an optical transmission system propagates in multi modes and a few modes.

The optical transmission system described in Non-Patent Document 2 transmits signal light by placing a signal on light in each of $LP_{01}$ mode, $LP_{11}$ mode, and $LP_{21}$ mode. The optical transmission system described in Non-Patent Document 3 transmits signal light by placing a signal on light in each of $LP_{01}$ mode, $LP_{11}$ mode, $LP_{21}$ mode, and $LP_{02}$ mode. The load on the DSP of the MIMO in the optical transmission systems described in Non-Patent Documents 2, 3 is comparable to that of the optical transmission system in the related art including the single-mode fiber as a transmission line. However, the propagation distance of signal light in the optical transmission systems described in Non-Patent Documents 2, 3 is about 40 km.

In order to increase the transmission distance, further reduction in crosstalk between modes is required. For example, in Non-Patent Document 4, when the optical fiber having a high mode extinction ratio is used as a transmission line of an optical transmission system, the loss of signal light is about 0.218 dB/km, which is larger than that of the single-mode fiber in the related art. Since $GeO_2$ is highly doped in the optical fiber having a high mode extinction ratio, the relative refractive index difference of the optical fiber having a high mode extinction ratio is 0.67%. The relative refractive index difference of the single-mode fiber in the related art is about 0.35%. Since the relative refractive index difference of an optical fiber having a high mode extinction ratio is higher than that of the single-mode fiber in the related art, the Rayleigh scattering loss of an optical fiber having a high mode extinction ratio is increased. As the Rayleigh scattering loss increases, the loss of signal light in an optical fiber with a high mode extinction ratio becomes larger than that of the single-mode fiber in the related art.

In order to increase the transmission distance of the optical transmission system, it is important to obtain a sufficient signal-to-noise ratio at the reception end. In order to obtain a sufficient signal-to-noise ratio at the reception end, it is necessary to increase the input intensity to the optical fiber as a transmission line. On the other hand, in order to suppress signal deterioration due to nonlinear effects that occur as the light intensity increases, it is desired to increase the effective area of each propagation mode at the core. For example, in the optical fiber described in Non-Patent Document 4, the effective area $A_{eff}$ of the $LP_{01}$ mode, which is the fundamental mode, is 124 $\mu m^2$.

CITATION LIST

Non-Patent Literature

[Non-Patent Document 1] S. O. Arik, D. Askarov, J. M. Kahn, "Effect of mode coupling on signal processing complexity in mode-division multiplexing," J. LightwaveTechnol. Vol. 31 (3), (2013), pp. 423-431.

[Non-Patent Document 2] P. Genevaux, C. Simonneau, G. Labroille, B. Denolle, O. Pinel, P. Jian, J. F. Morizur, G. Charlet, "6-mode Spatial Multiplexer with Low Loss and High Selectivity for Transmission over Few Mode Fiber," OFC 2015, paper W1A.5.

[Non-Patent Document 3] C. Simonneau, P. Genevaux, G. L. Cocq, Y. Quiquempois, L. Bigot, A. Boutin, M. Bigot-Astruc, P. Sillard, G. Charlet, "5-mode Amplifier with Low Modal Crosstalk for Spatial Mode Multiplexing Transmission with Low Signal Processing Complexity," ECOC 2015, paper We.2.4.2.

[Non-Patent Document 4] P. Sillard, M. B. Astruc, D. Boivin, H. Maerten, L. Provost, "Few-Mode Fiber for Uncoupled Mode-Division Multiplexing Transmissions," ECOC 2011, paper Tu.5.LeCervin.7.

DISCLOSURE OF INVENTION

Technical Problem

In order to extend the transmission distance capable of transmitting signal light without using a repeater, it is required to reduce the crosstalk, the loss, and the nonlinearity of an optical fiber as a transmission line. The present invention has been made in view of the above-described problems. According to the present invention, there is provided an optical fiber that is excellent in reducing the crosstalk, the loss, and the nonlinearity and propagates only light in a specific propagation mode, and an optical transmission system including the optical fiber.

Solution to Problem

The optical fiber of the present invention is, for example, an optical fiber in which the relative refractive index difference is reduced because the cladding is doped with fluorine, and a core is made of silica. A low-loss single-mode fiber of about 0.146 dB/km and 0.1419 dB/km having the core made of silica has already been proposed. For such a low-loss single-mode fiber, for example, Reference 1 (S. Makovejs, et. al. "Record-Low (0.1460 dB/km) Attenuation Ultra-Large Aeff Optical Fiber for Submarine Applications," OFC 2015, Post Deadline Papers, paper Th5A.2) or Reference 2 (Y. Tamura, et. al. "Lowest-Ever 0.1419-dB/km Loss Optical Fiber," OFC 2017, paper Th5D.1) can be referred to. However, the effective area of the optical fiber described in Reference 1 is 148 μm², and the effective area of the optical fiber described in Reference 2 is 147 μm².

There has been reported an optical transmission system that propagates only the $LP_{11}$ mode, which is the first higher-order mode, on a transmission line including an optical fiber capable of propagating the $LP_{01}$ mode and $LP_{11}$ mode. For an optical transmission system that propagates only the $LP_{11}$ mode, for example, Reference 3 (A. A. Amin, et. al. "Dual-$LP_{11}$ mode 4×4 MIMO-OFDM transmission over a two-mode fiber," Opt. Exp. Vol. 19 (17), (2011), pp. 16672-16679) can be referred to.

In order to achieve the object of being effective in reducing the crosstalk, the loss, and the nonlinearity and transmits only light in a specific propagation mode (particularly, $LP_{02}$ mode), the present inventors have studied the structure of an optical fiber in consideration of an effective cutoff wavelength. In a case of designing a few-mode fiber, it is important to ensure that light of a specific mode propagates in the wavelength range of the signal light to be transmitted. The cutoff wavelength of light in a mode that is not propagated in the assumed wavelength range is a basic parameter related to the structure of the few-mode fiber. Hereinafter, a mode that does not propagate in an assumed wavelength range may be referred to as an unnecessary mode.

In an actual optical fiber, the loss of unnecessary modes in almost the cutoff wavelength increases. Thus, a phenomenon that only light of a specific mode is guided occurs, in a wavelength range shorter than the cutoff wavelength capable of guiding higher-order mode light theoretically. For this phenomenon, for example, Reference 4 (Y. Kato, et. al. "Effective Cutoff Wavelength of the LP11 Mode in Single-Mode Fiber Cables," IEE J. Quantum Electon. QE-17 (1), (1981), pp. 35-39) can be referred to.

In order to achieve the above object, the present inventor has intensively studied, conceived the present invention by newly finding an optical transmission system including <1> a transmitter, <2> a transmission line including an optical fiber through which light of a plurality of modes propagates, <3> a mode multiplexer that is configured to excite and multiplex only a specific mode (in particular, $LP_{02}$ mode), <4> a mode demultiplexer that demultiplexes only the specific mode and converts the specific mode into a fundamental mode (that is, $LP_{01}$ mode), and <5> a receiver, and completed the present invention. Since the optical transmission system having these configurations suppresses crosstalk between modes, the load on the DSP can be reduced. In the present invention, the propagation loss is reduced in consideration of the effective cutoff wavelength. In the present invention, only light of a specific mode (that is, $LP_{02}$ mode) propagates on a transmission line including an optical fiber having an increased effective area. Thus, an optical transmission system is provided in which the crosstalk between modes is suppressed, the transmission capacity can be increased and the transmission distance can be increased, and the DSP load can be reduced.

An optical fiber according to the present invention includes a core, and a cladding that is provided on an outer periphery of the core and has a refractive index lower than a refractive index of the core. A V value representing a normalized frequency of an $LP_{02}$ mode is greater than or equal to 4.8 and less than or equal to 6.4.

In the optical fiber of the present invention, the V value representing the normalized frequency of the $LP_{02}$ mode may be greater than or equal to 5.3 and less than or equal to 6.4. An effective area may be greater than or equal to 150 μm². A radius of the core may be greater than or equal to 8.0 μm and less than or equal to 13.4 μm. A relative refractive index difference may be greater than or equal to 0.33% and less than or equal to 0.55%.

An optical transmission system according to the present invention includes a transmission line including the optical fiber as described above, a transmitter that is configured to output signal light, a mode exciter that is configured to excite a linearly polarized mode of the signal light output from the transmitter to an $LP_{02}$ mode and input the excited signal light to the transmission line, a mode converter that is configured to convert the linearly polarized mode of the signal light, which is excited to the $LP_{02}$ mode and output from the transmission line, into a fundamental mode, and a receiver that is configured to receive the signal light converted into the fundamental mode. The optical fiber is configured to propagate the signal light excited to the $LP_{02}$ mode.

The optical transmission system of the present invention may include a first amplifier that is configured to amplify the signal light excited to the $LP_{02}$ mode.

Additionally, the optical transmission system of the present invention may include a sixth mode converter that is configured to convert the signal light of the $LP_{02}$ mode into the signal light of the fundamental mode as an unnecessary mode removal device that removes modes other than the $LP_{02}$ mode between the mode exciter and the mode converter, a seventh mode converter that is configured to convert the signal light of the fundamental mode into the signal light of the $LP_{02}$ mode, and an optical fiber which connects the sixth mode converter and the seventh mode converter and to which bending is applied, or a single-mode fiber that connects the sixth mode converter and the seventh mode converter.

An optical transmission system according to the present invention includes a transmission line including the optical fiber as described above, a transmitter that is configured to output signal light, a mode exciter that is configured to excite a linearly polarized mode of the signal light output from the transmitter to an $LP_{02}$ mode and inputs the excited signal light to the transmission line, a first mode converter that is configured to convert the linearly polarized mode of the signal light, which is excited to the $LP_{02}$ mode and output from the transmission line, into a fundamental mode, a second amplifier that is configured to amplify the signal light converted to the fundamental mode and output from the first mode converter, a second mode converter that is configured to excite a linearly polarized mode of the signal light of the fundamental mode amplified by the second amplifier to an $LP_{02}$ mode, a third mode converter that is configured to convert the linearly polarized mode of the signal light of the $LP_{02}$ mode excited by the second mode converter into a fundamental mode, and a receiver that is configured to receive the signal light of the fundamental mode converted by the third mode converter.

The optical fiber is configured to propagate the signal light excited to the $LP_{02}$ mode.

An optical transmission system according to the present invention includes a transmission line including the optical fiber as described above, a transmitter that is configured to output signal light, a mode exciter that is configured to excite a linearly polarized mode of the signal light output from the transmitter to an $LP_{02}$ mode and input the excited signal light to the transmission line, an excitation light source for Raman amplification, a fourth mode converter that is configured to convert the linearly polarized mode of the excitation light output from the excitation light source for Raman amplification into the $LP_{02}$ mode, an excitation light multiplexer that is configured to multiplex the excitation light converted by the fourth mode converter to the transmission line, a fifth mode converter that is configured to convert the linearly polarized mode of the signal light output from the transmission line into a fundamental mode, and a receiver that is configured to receive the signal light converted into the fundamental mode by the fifth mode converter. The optical fiber is configured to propagate the signal light excited to the $LP_{02}$ mode.

An optical transmission system according to the present invention includes a transmission line including the optical fiber as described above, a transmitter that is configured to output signal light, a mode exciter that is configured to excite a linearly polarized mode of the signal light output from the transmitter to an $LP_{02}$ mode and input the excited signal light to the transmission line, an excitation light source, a fourth mode converter that is configured to convert the linearly polarized mode of the excitation light output from the excitation light source into the $LP_{02}$ mode, an excitation light multiplexer that is configured to multiplex the excitation light converted by the fourth mode converter to the transmission line, an amplification fiber that is provided in the transmission line, and is configured to amplify the signal light excited by the excitation light in the mode exciter, a fifth mode converter that is configured to convert the linearly polarized mode of the signal light output from the transmission line into a fundamental mode, and a receiver that is configured to receive the signal light converted into the fundamental mode by the fifth mode converter. The optical fiber is configured to propagate the signal light excited to the $LP_{02}$ mode.

In the optical transmission system of the present invention, a third amplifier may be provided between the excitation light multiplexer and the fifth mode converter.

Advantageous Effects of Invention

According to the present invention, when an optical fiber designed by considering an effective cutoff wavelength is used as a transmission line, only light of a specific mode (that is, $LP_{02}$ mode) is propagated, so low crosstalk, low loss, and low nonlinearity are realized, an increase of load of DSP in a MIMO in mode multiplexed transmission is mitigated, and a transmission distance can be increased.

BEST MODE FOR CARRYING OUT THE INVENTION

Embodiments of the present invention will be described below with reference to the drawings. The embodiments described below are examples of the present invention, and the present invention is not limited to embodiments described below. Note that in this specification and the drawings, the same signs are given to configurations having the same functions, and redundant descriptions of those configurations are omitted.

First Embodiment

Figure 1A:
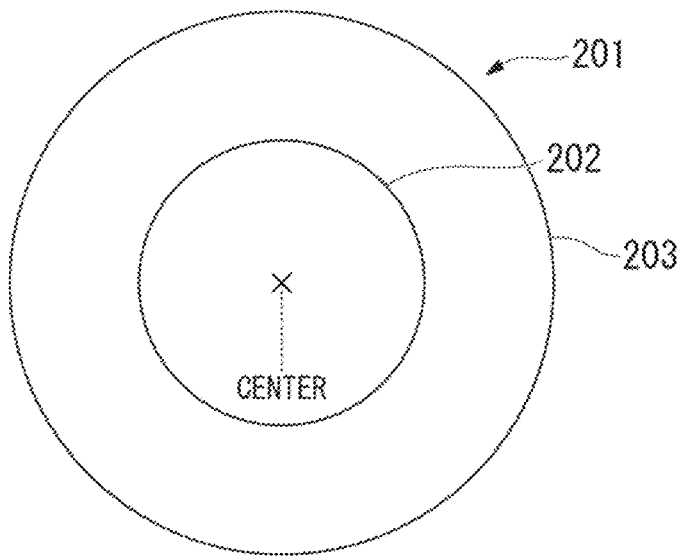
FIG. 1A is a cross-sectional view along a radial direction of an optical fiber of the present invention.

As shown in FIG. 1A, an optical fiber 201 according to a first embodiment of the present invention includes a core 202, and a cladding 203 that is provided on the outer periphery of the core 202 and has a lower refractive index than the core 202.

Figure 1B:
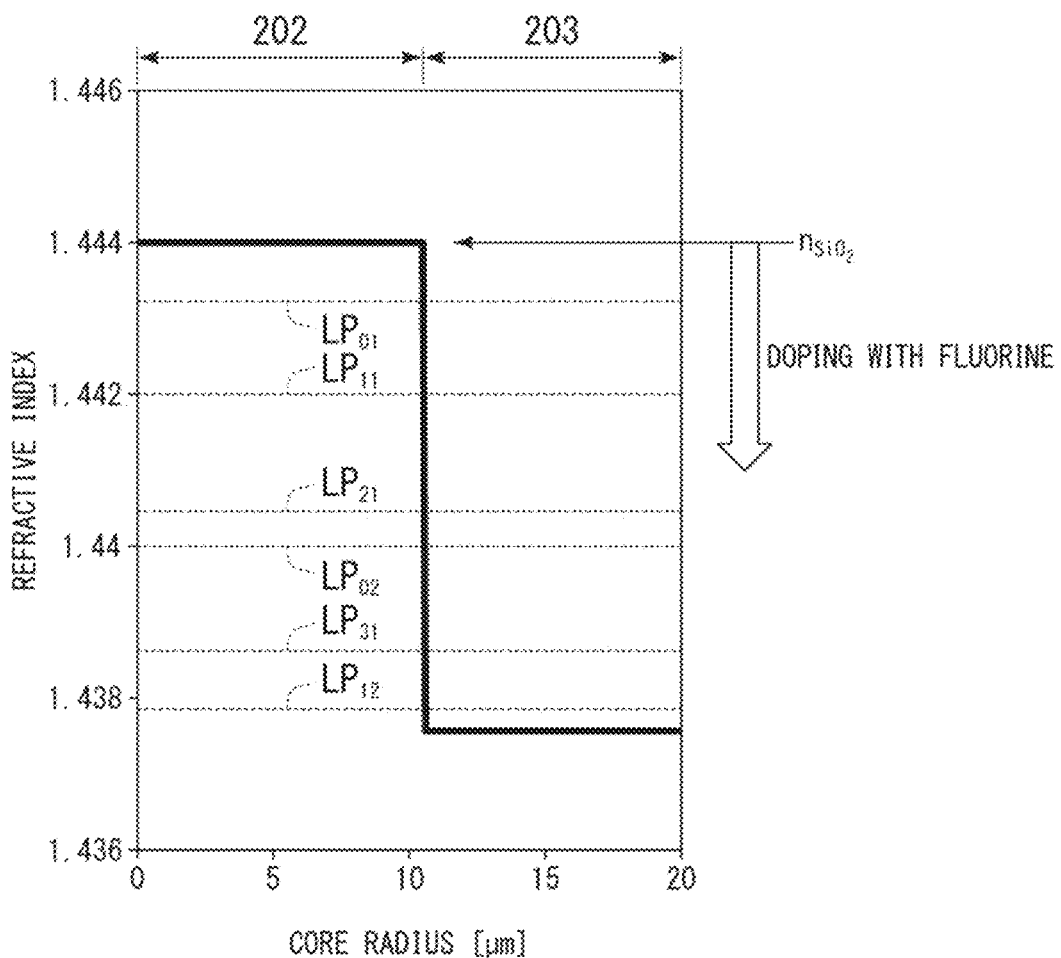
FIG. 1B is a diagram showing a refractive index distribution of the optical fiber of the present invention.

As shown in FIG. 1B, the optical fiber 201 has a refractive index distribution of step-index-type. Since the optical fiber 201 has the refractive index distribution of step-index-type, the optical fiber 201 can be easily designed and manufactured. The core 202 is made of silica having a purity of 99.999999% or more and an impurity ratio of $10^{-6}$% by mass or less. In the present invention, the core radius (radius) r of the core 202 is increased and the relative refractive index difference Δ with respect to the cladding 203 is reduced, as compared with the related art. In the present invention, there are effective refractive indices of the $LP_{31}$ mode and the $LP_{12}$ mode theoretically. Since the optical fiber 201 satisfies the bend loss and cutoff conditions as will be described later, light of $LP_{31}$ mode and $LP_{12}$ mode does not propagate in the optical fiber 201.

Figure 2:
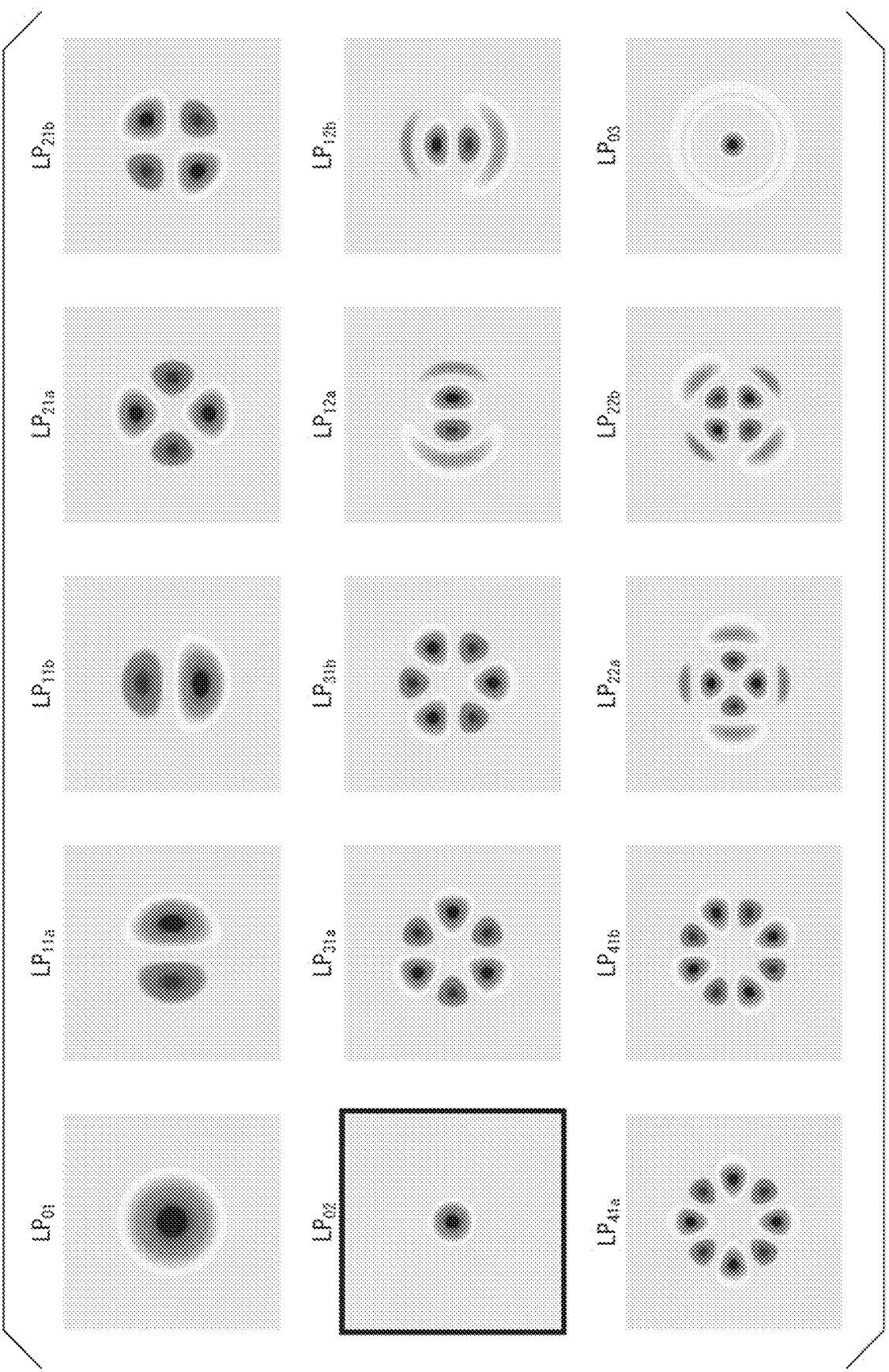
FIG. 2 is a diagram showing intensity distributions of modes propagating through the optical fiber of the present invention.

A few-mode fiber (optical fiber) used in mode multiplexed transmission transmits higher-order mode light carrying a signal. When the core 202 is enlarged, light of each mode of $LP_{01}$, $LP_{11}$, $LP_{21}$, $LP_{02}$, $LP_{31}$, $LP_{12}$, $LP_{41}$, $LP_{22}$, and $LP_{03}$ shown in FIG. 2 can be propagated sequentially. In a normal single-mode fiber, only the $LP_{01}$ mode, which is the fundamental mode, can propagate. Therefore, the radius of the core of the single-mode fiber is about 4.5 μm, and the relative refractive index difference of the single-mode fiber is about 0.35%. Since expansion of the effective area and low crosstalk can be expected, the present invention adopts the $LP_{02}$ mode as the specific mode.

In the design of a few-mode fiber, it is required that light of a desired mode propagates reliably in the wavelength range of signal light to be transmitted. In an optical fiber in which the $LP_{02}$ mode propagates in the C band (wavelength range from 1530 nm to 1565 nm), it is necessary to consider the cutoff condition at 1565 nm of the $LP_{31}$ mode, which is the lowest order mode of the unnecessary mode, and the bend loss at 1565 nm of the $LP_{02}$ mode. In the step-index optical fiber, it is considered that the bend loss of the desired highest order mode on the longer wavelength side where the bending loss becomes the largest. A design of a step-index optical fiber capable of propagating light of seven LP modes is already known. However, in the optical fiber in the related art capable of propagating light of seven LP modes, an increase in the number of modes to be propagated and an increase in propagation loss are suggested.

The V value representing the normalized frequency of the optical fiber is expressed by Expression (1).

[Equation 1]

$$V = \frac{2\pi r}{\lambda}\sqrt{n_{core}^2 - n_{clad}^2} \quad (1)$$

In Expression (1), λ represents the wavelength of light, $n_{core}$ represents the refractive index of the core 202, and $n_{clad}$ represents the refractive index of the cladding 203.

When the optical fiber 201 can propagate a single mode, the V value<2.4. When the optical fiber 201 can propagate two LP modes, 2.4<V value<3.8. When the optical fiber 201 can propagate four LP modes, 3.8<V value<5.1. When the optical fiber 201 can propagate five LP modes, 5.1<V value<5.5. When the optical fiber 201 can propagate six LP modes, 5.5<V value<6.4. When the optical fiber 201 can propagate seven LP modes, 6.4<V value<7.0. Further, when designing the optical fiber 201, it is necessary to consider the bend loss of a desired mode in addition to the V value.

Figure 3:
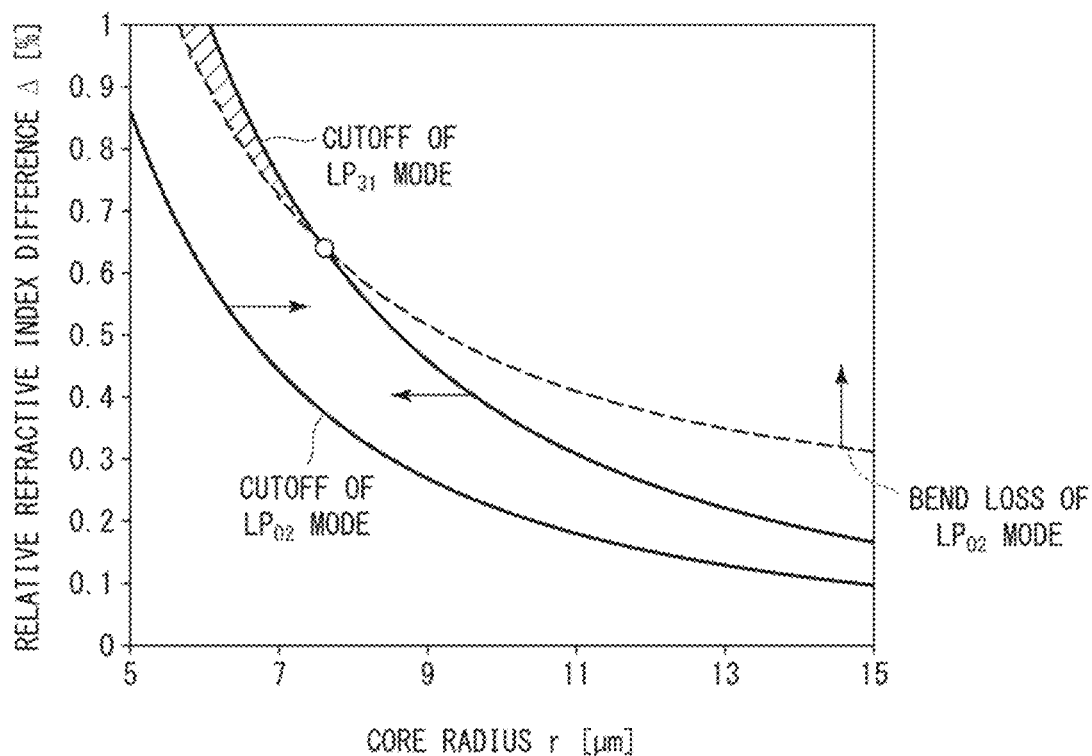
FIG. 3 is a graph showing a relationship between a core radius and a relative refractive index difference of the optical fiber of the present invention.

As shown in FIG. 3, regarding the bend loss of the optical fiber 201, ITU-T G 652 is referred to, and attention is paid to the condition that the bending radius R=30 mm and 0.1 dB/100 turn or less at the wavelength of 1565 nm where the loss of light of the desired mode is the largest. Since the effect of mode confinement increases as the relative refractive index difference increases, the region above the dotted line in FIG. 3 is a design region that satisfies the condition of the bend loss. Regarding the cutoff condition of the optical fiber 201, attention is paid to the short wavelength 1530 nm of the lowest order $LP_{31}$ mode among unnecessary modes. The smaller the relative refractive index difference, the weaker the effect of confinement. The smaller the core radius, the weaker the effect of confinement. Therefore, the region below the solid line in FIG. 3 is a region where the $LP_{31}$ mode does not propagate. That is, the region above the dotted line and below the solid line is a design region where the $LP_{02}$ mode can propagate.

Figure 4:
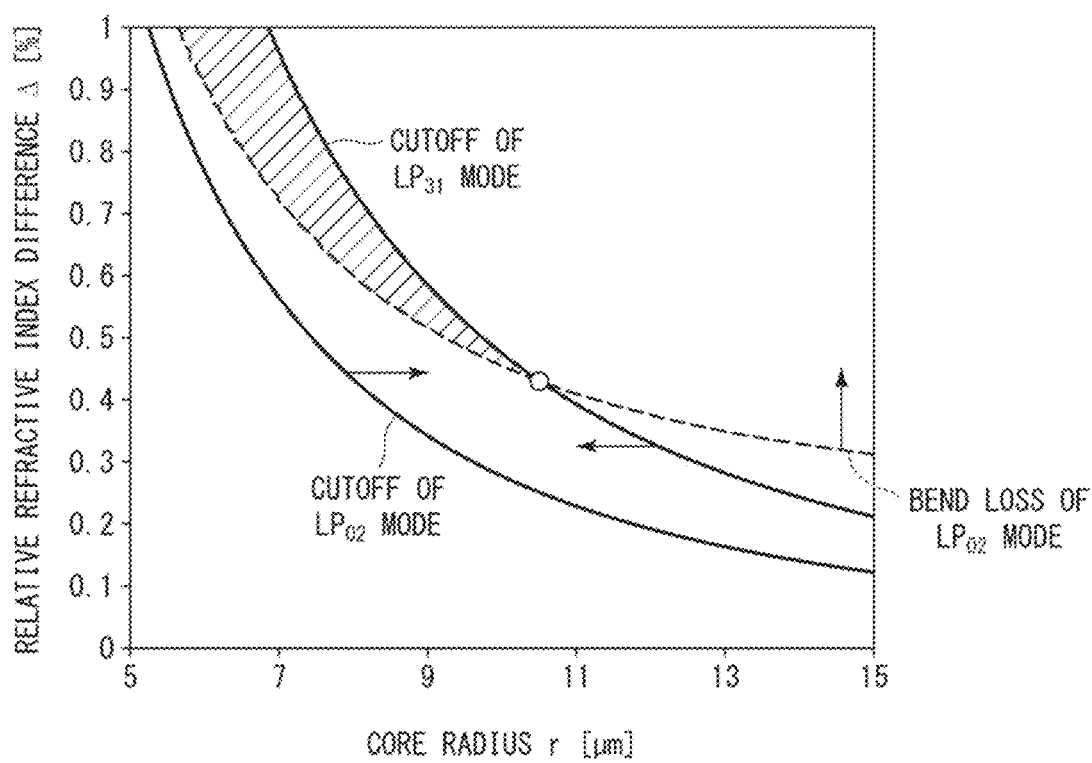
FIG. 4 is a graph showing a relationship between the core radius and the relative refractive index difference of the optical fiber of the present invention when an effective cutoff coefficient for the core radius and the relative refractive index difference is 1.13.
Figure 5:
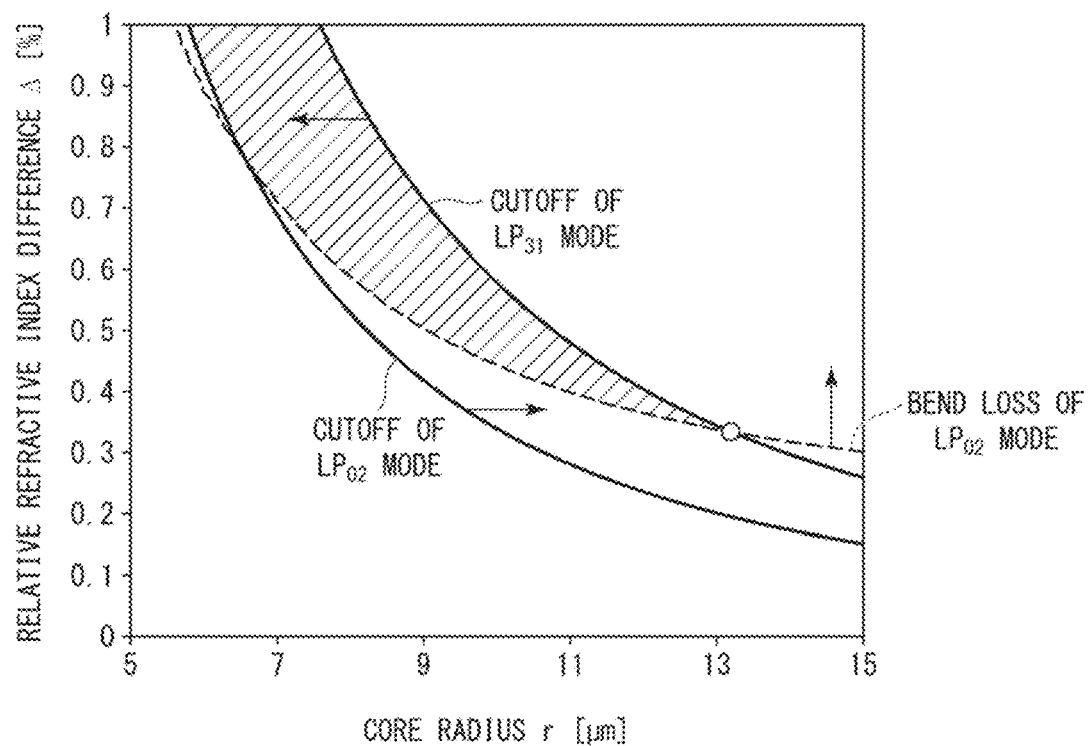
FIG. 5 is a graph showing a relationship between the core radius and the relative refractive index difference of the optical fiber of the present invention when an effective cutoff coefficient for the core radius and the relative refractive index difference is 1.25.

The relationship of $\lambda_c = K_\lambda \times \lambda_{ce}$ holds for the theoretical cutoff wavelength ($\lambda_c$) and the effective cutoff wavelength ($\lambda_{ce}$). From the above relational expression, it is known that the coefficient $K_\lambda$ is greater than or equal to 1.13 and less than or equal to 1.25. FIG. 4 shows the relationship between the core radius r of the core 202 and the relative refractive index difference Δ of the optical fiber 201 when the coefficient $K_\lambda$ is 1.13. FIG. 5 shows the relationship between the core radius r of the core 202 and the relative refractive index difference Δ of the optical fiber 201 when the coefficient $K_\lambda$, is 1.2. The relative refractive index difference Δ of the optical fiber 201 is expressed by Expression (2).

[Equation 2]

$$\Delta = \frac{n_{core}^2 - n_{clad}^2}{2n_{core}^2} \quad (2)$$

In order to increase the effective area and reduce the loss in the design region that satisfies the cutoff condition of the unnecessary mode and the bend loss of the light of the desired mode, the core radius r may be large and the relative refractive index difference Δ may be small. In other words, the design region that satisfies the cutoff condition of the unnecessary mode and the bend loss of the light of the desired mode is obtained from the intersection of the curve representing the cutoff condition of the unnecessary mode and the curve representing the bend loss of the light of the desired mode. For example, when the coefficient $K_\lambda$ is 1.25, the V value is greater than or equal to 4.8 and less than or equal to 6.4.

When considering the effective cutoff, the core radius r can be enlarged and the relative refractive index difference Δ can be reduced as compared with the case where the theoretical cutoff is considered. The relative refractive index difference Δ can be less than or equal to 0.35%. This indicates that an optical fiber designed by considering the effective cutoff condition can expand the effective area and reduce the loss rather than an optical fiber designed by considering theoretical cutoff condition.

Figure 6:
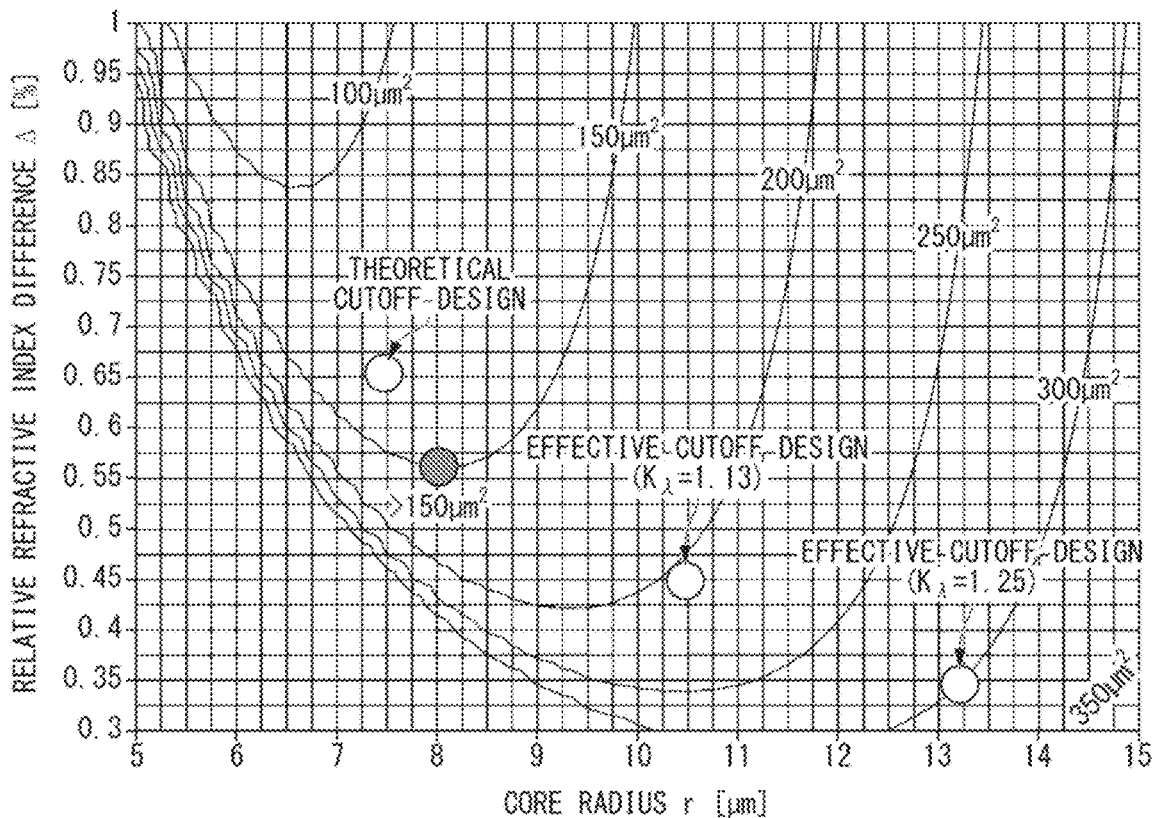
FIG. 6 is a graph showing the relationship between the core radius and the relative refractive index difference when the effective area of the $LP_{02}$ mode of the optical fiber of the present invention is changed.

As shown in FIG. 6, in the case of an optical fiber designed by considering an effective cutoff, it can be seen that an effective area of 300 μm² or more can be realized. The effective area in the fundamental mode of a fiber designed under single-mode conditions (for example, References 1 and 2) is less than or equal to 150 μm². It is possible to realize an effective area of an optical fiber in which an effective cutoff is considered that is twice of that of the fiber designed under single-mode conditions.

As shown in FIG. 5, in an optimum design region in consideration of an effective cutoff, in order to ensure an effective area of 150 μm² or more, it is preferable that the V value of the optical fiber 201 is greater than or equal to 5.3 and less than or equal to 6.4. In order to prevent an increase in propagation loss, it is preferable that the relative refractive index difference Δ is small. That is, in order to realize propagation of $LP_{02}$ mode with an effective area of 150 μm² or more and low loss, the core radius is preferably greater than or equal to 8.0 μm and less than or equal to 13.4 μm, and the relative refractive index difference is preferably greater than or equal to 0.33% and less than or equal to 0.55%.

If the V value is greater than or equal to 5.3 and less than or equal to 6.4, the same effect as that of the optical fiber 201 can be obtained in the optical fiber having not only the step index-type refractive index distribution but also an arbitrary refractive index distribution such as a ring type, a multi-step staircase type, or a graded index type. Further, the silica constituting the core 202 may be doped with an additive such as germanium, fluorine, or chlorine at about $10^{-6}$% by mass or less.

Figure 7:
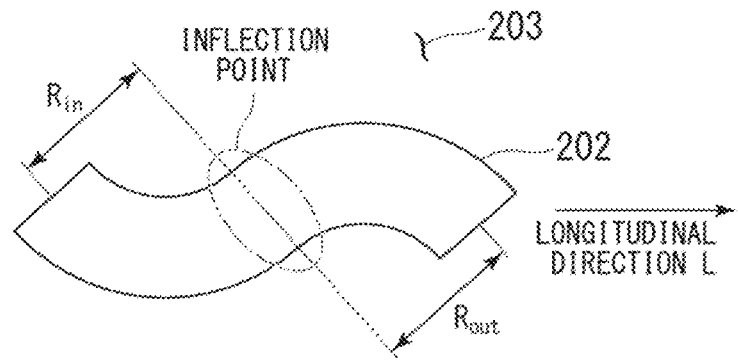
FIG. 7 is a diagram showing bending of the optical fiber.
Figure 8:
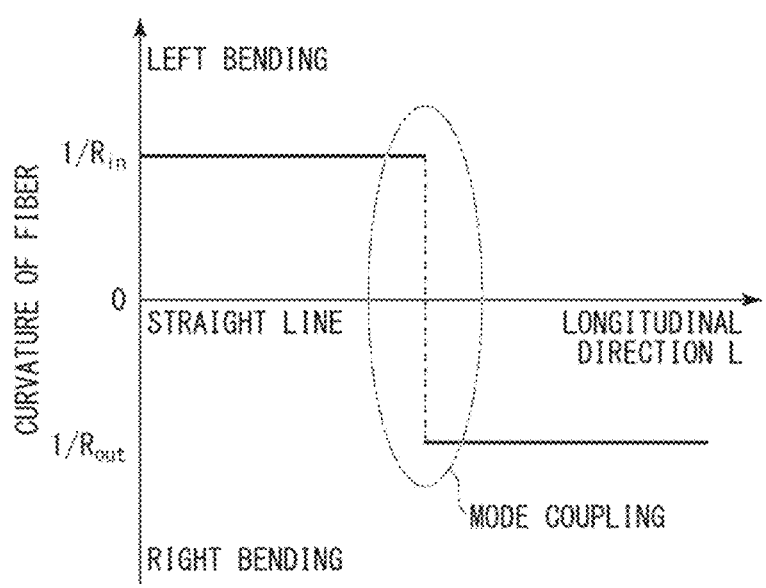
FIG. 8 is a graph showing mode coupling with respect to the curvature of the optical fiber.
Figure 9:
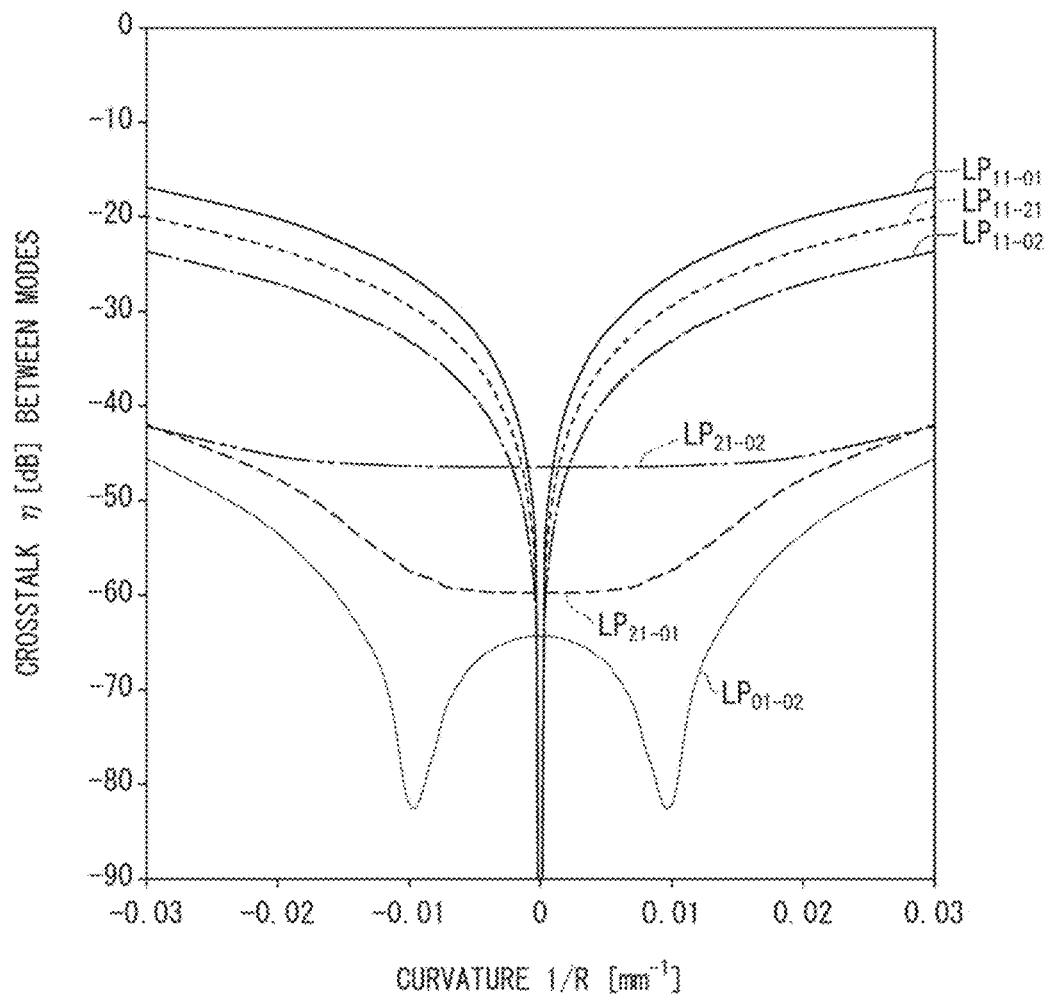
FIG. 9 is a graph showing a relationship between the curvature and crosstalk between modes of the optical fiber of the present invention.

The crosstalk between modes of the optical fiber 201 occurs when the curvature of the core 202 changes with respect to the longitudinal direction of the optical fiber 201 as shown in FIGS. 7 and 8. FIG. 9 shows the calculation result of the crosstalk between modes when the core radius r is 10.5 μm and the relative refractive index difference Δ is 0.45%. The crosstalk between modes shown in FIG. 9 is calculated using the coupling efficiency by the overlap integration of the electric field in each mode when the core 202 is bent.

The crosstalk η between modes in FIG. 9 is expressed by Expression (3).

[Equation 3]

$$\eta = \frac{\left| \int\int E_{in} \cdot E_{out}^* dxdy \right|}{\int\int |E_{in}|^2 dxdy \cdot \int\int |E_{out}|^2 dxdy} \quad (3)$$

In Expression (3), $E_{in}$ is an electric field of a mode incident on the inflection point, and $E_{out}$ is an electric field of a mode exiting from the inflection point. $LP_{11-01}$ in FIG. 9 represents a crosstalk η between the $LP_{11}$ mode and the $LP_{01}$ mode.

For example, the crosstalk between modes of the $LP_{01}$ mode and the $LP_{11}$ mode is expressed by the following Expression (4).

[Equation 4]

$$XT_{01-11} = 10\log_{10}\frac{\eta_{01-11}}{\eta_{01-01}} \quad (4)$$

In Expression (4), $\eta_{01-11}$ represents the coupling amount from the $LP_{01}$ mode to the $LP_{11}$ mode, and $\eta_{01-01}$ represents the coupling amount from the $LP_{01}$ mode to the $LP_{01}$ mode.

As shown in FIG. 9, the crosstalk between the $LP_{11}$ mode and other modes ($LP_{01}$ mode, $LP_{21}$ mode, $LP_{02}$ mode) is −30 dB or more when the absolute value of the curvature 1/R is 0.02 mm$^{-1}$ or more. The crosstalk η between modes of the $LP_{01}$ mode and the $LP_{02}$ mode is the smallest as compared to other crosstalk η between modes, except when the curvature 1/R is in the vicinity of 0. If the absolute value of the curvature 1/R is 0.02 mm$^{-1}$ or less, the crosstalk between the $LP_{11}$ mode and the $LP_{02}$ mode is reduced. The curvature 1/R of 0.02 mm$^{-1}$ or less corresponds to a bending radius of 50 mm or more.

However, the allowable bending radius of a normal optical fiber is defined as 30 mm. For example, the standard outer diameter of a slot-type optical fiber cable or a loose tube-type optical fiber cable is greater than or equal to 10 mm and less than or equal to 20 mm. The allowable bending radius is 10 times to 20 times of the outer diameter of the optical fiber (that is, 100 mm to 400 mm) Further, the bending radius may be less than or equal to 500 mm due to the occurrence of minute bending such as microbending.

As described above, the optical fiber 201 of the first embodiment has an effective area larger than that of the single-mode fiber in the related art, and achieves the lowest crosstalk than other modes while propagating $LP_{02}$ mode light.

Second Embodiment

Next, an optical fiber and an optical transmission system according to a second embodiment will be described. The $LP_{02}$ mode can reduce crosstalk compared to other modes. When considering the $LP_{03}$ mode, there is a possibility that crosstalk occurs between the $LP_{31}$ mode, $LP_{12}$ mode, $LP_{41}$ mode, and $LP_{22}$ mode. Therefore, the $LP_{02}$ mode is employed in the second embodiment in order to reduce crosstalk.

Table 1 shows the optical characteristics of eight prototype optical fibers (Spool 1 to 8) when the core radius r is 10.5 μm and the relative refractive index difference Δ is 0.45%.

TABLE 1

| Spool | Fiber length (km) | Attenuation (dB/km) | | | | $A_{eff}$ (μm$^2$) | | | |
|---|---|---|---|---|---|---|---|---|---|
| | | LP01 | LP11 | LP21 | LP02 | LP01 | LP11 | LP21 | LP02 |
| 1 | 11.5 | 0.163 | 0.169 | 0.177 | 0.175 | 236 | 344 | 373 | 224 |
| 2 | 18.2 | 0.165 | 0.167 | 0.171 | 0.178 | 241 | 348 | 377 | 225 |
| 3 | 22.9 | 0.164 | 0.165 | 0.173 | 0.175 | 236 | 343 | 374 | 226 |
| 4 | 25.3 | 0.164 | 0.168 | 0.176 | 0.179 | 228 | 333 | 364 | 222 |
| 5 | 32.0 | 0.165 | 0.166 | 0.179 | 0.182 | 231 | 335 | 369 | 225 |
| 6 | 25.3 | 0.167 | 0.167 | 0.178 | 0.177 | 226 | 329 | 360 | 219 |
| 7 | 31.5 | 0.163 | 0.165 | 0.173 | 0.171 | 217 | 311 | 343 | 209 |
| 8 | 38.2 | 0.164 | 0.168 | 0.179 | 0.177 | 227 | 328 | 361 | 220 |

The fundamental mode loss of the fiber described in Non-Patent Document 4 is 0.218 dB/km. The average loss of the fundamental mode of the eight prototyped optical fibers shown in Table 1 is 0.164 dB/km, and a reduction in loss is realized. Further, as shown in the calculation result of the effective area of the $LP_{02}$ mode with respect to the core radius and the relative refractive index difference in FIG. 6, the effective area of the $LP_{02}$ mode is greater than or equal to 200 μm$^2$.

Figure 10:
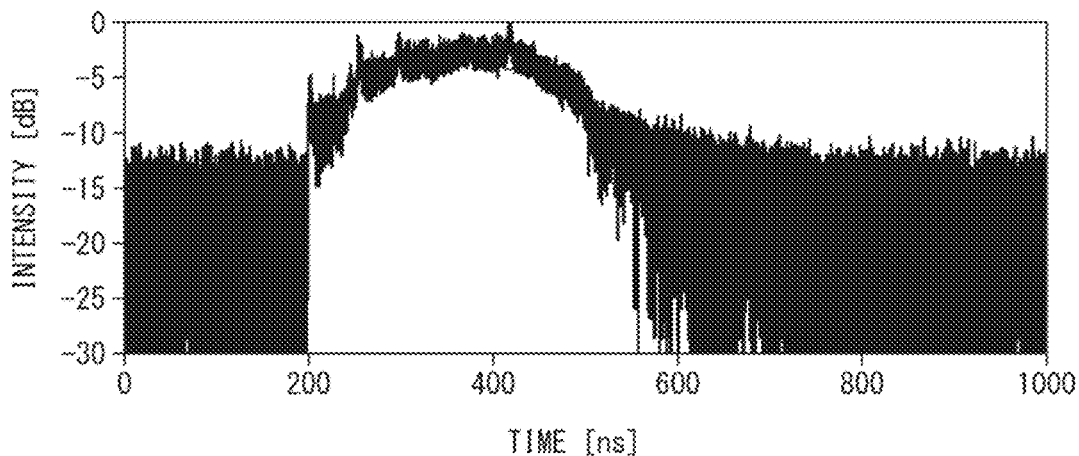
FIG. 10 is a graph showing an impulse response of the $LP_{01}$ mode in the optical fiber of the present invention.
Figure 11:
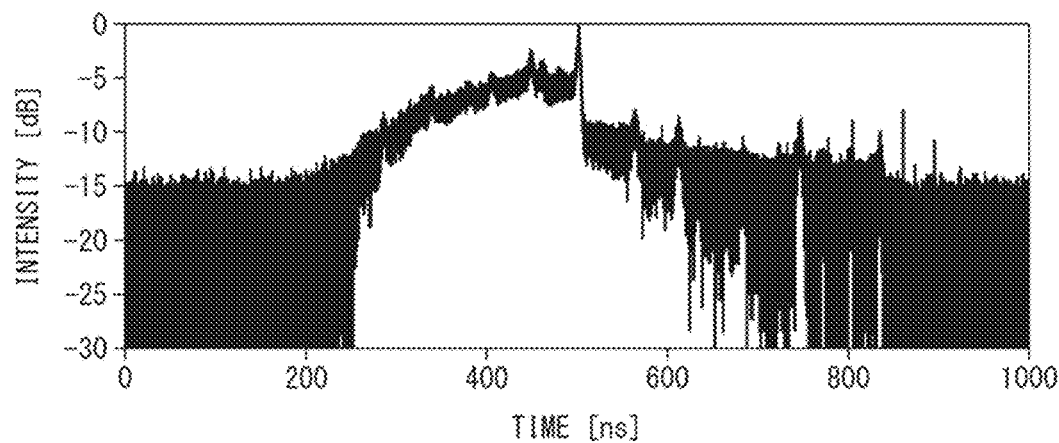
FIG. 11 is a graph showing an impulse response of the $LP_{11}$ mode in the optical fiber of the present invention.
Figure 12:
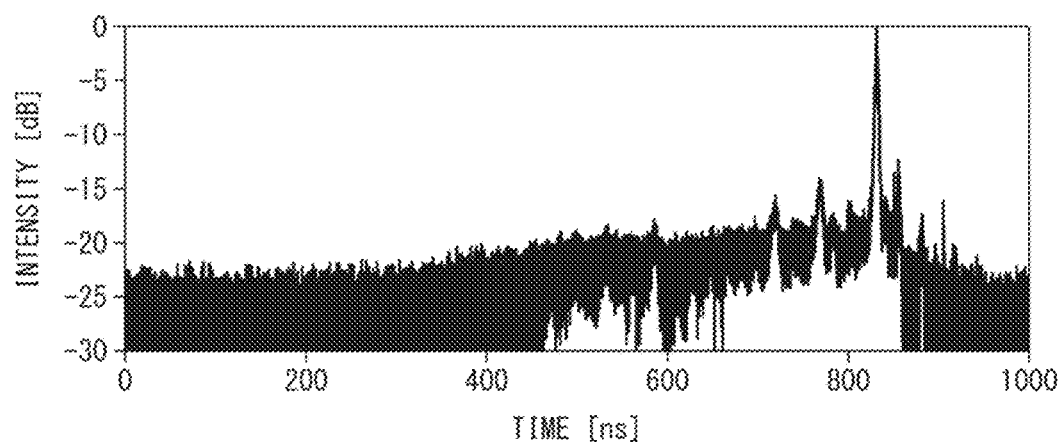
FIG. 12 is a graph showing an impulse response of the $LP_{21}$ mode in the optical fiber of the present invention.
Figure 13:
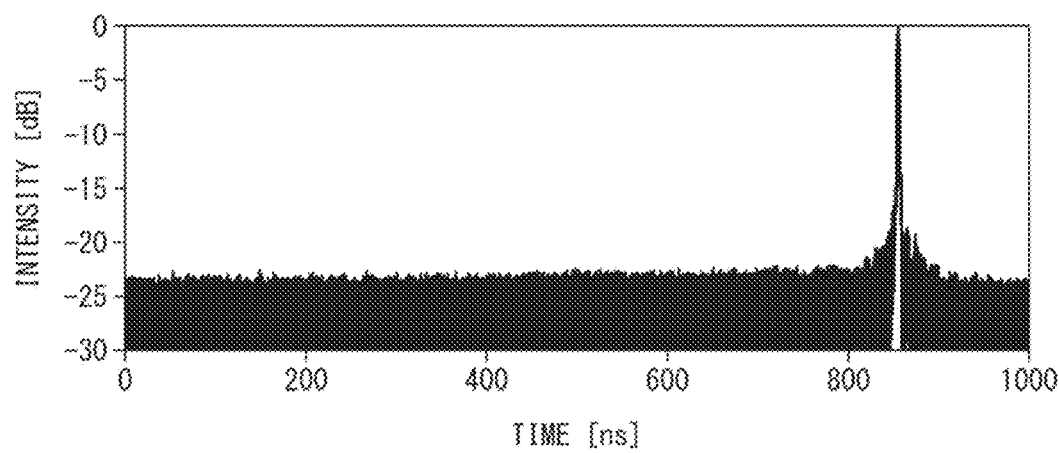
FIG. 13 is a graph showing an impulse response of the $LP_{02}$ mode in the optical fiber of the present invention.

Assuming that the wavelength of light is 1550 nm, as shown in FIGS. 10 and 11, for the $LP_{01}$ mode and the $LP_{11}$ mode, the distributed crosstalk is large and the pulse spreads. On the other hand, as shown in FIGS. 12 and 13, in the $LP_{21}$ mode and the $LP_{02}$ mode, the pulse spread is small. In particular, it can be seen that the $LP_{02}$ mode has a smaller crosstalk component compared to the other modes, and an extinction ratio of about 25 dB.

Figure 14A:
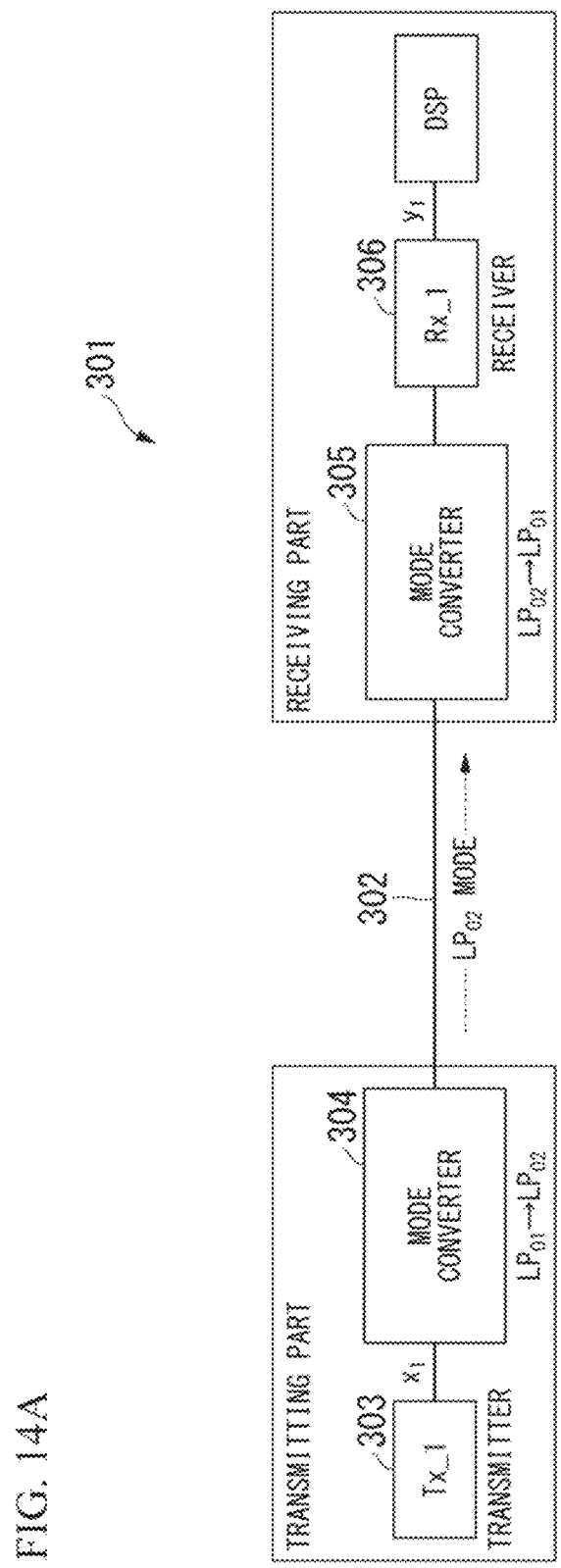
FIG. 14A is a diagram showing an optical transmission system of the present invention.
Figure 14B:
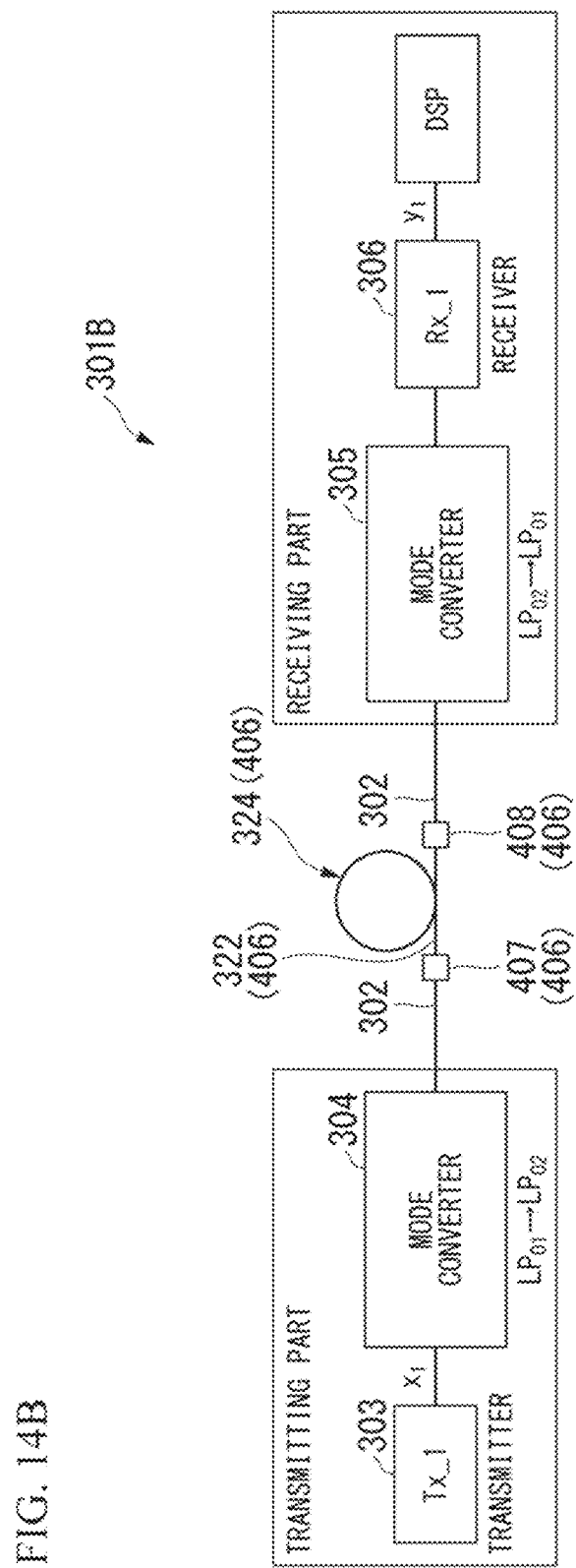
FIG. 14B is a diagram showing an optical transmission system of the present invention.
Figure 14C:
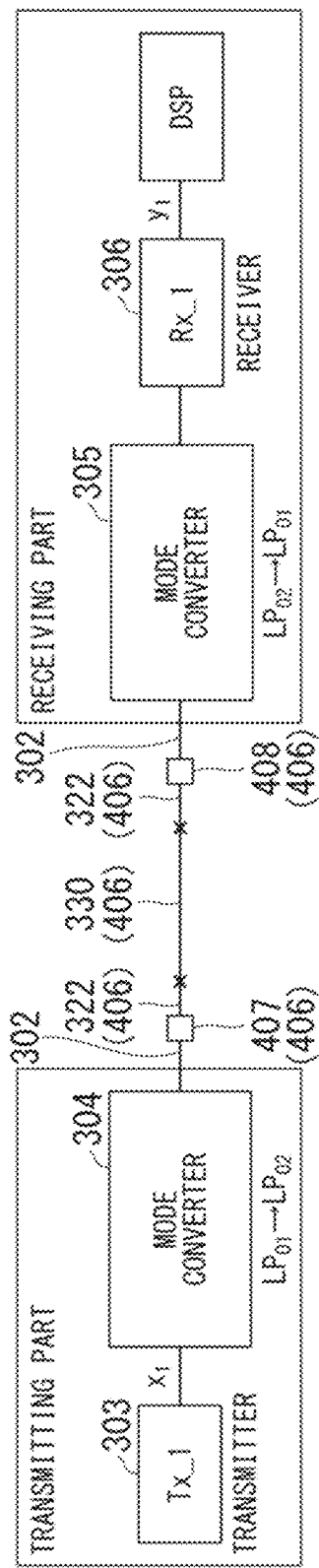
FIG. 14C is a diagram showing an optical transmission system of the present invention.

FIGS. 14A to 14C show the configuration of an optical transmission system 301 capable of satisfactorily transmitting light of the $LP_{02}$ mode. As shown in FIG. 14A, the optical transmission system 301 includes at least a transmission line 302, a transmitter 303, a mode converter (mode exciter) 304, a mode converter 305, and a receiver 306. The transmission line 302 has the optical fiber of the present invention explained above. The transmitter 303 outputs signal light. The mode converter 304 excites the linearly polarized mode of the signal light output from the transmitter 303 to the $LP_{02}$ mode, and inputs the signal light to the transmission line 302. The mode converter 305 converts the linearly polarized mode of the signal light, which is excited to the $LP_{02}$ mode and output from the transmission line 302, into a fundamental mode. The receiver 306 receives the signal light converted into the fundamental mode. The optical fiber constituting the transmission line 302 propagates the signal light excited to the $LP_{02}$ mode.

In the mode converter 304, a mode other than the $LP_{02}$ mode may slightly occur. In that case, signal processing in the receiver 306 becomes complicated because modes other than the $LP_{02}$ mode are accumulated over a long distance on the transmission line 302. The optical transmission system 301 preferably includes an unnecessary mode removal device 406 that removes a mode other than the $LP_{02}$ mode between the mode converters 304, 305. As shown in FIGS. 14B, 14C, as example, the unnecessary mode removal device 406 is a combination of the mode converter (the sixth mode converter) 407, the multi-mode fiber 322 to which bending is applied or the single-mode fiber 330, and the mode converter (the seventh mode converter) 408. The mode converter 407 converts the signal light of the $LP_{02}$ mode into a signal light of the fundamental mode. The mode converter 408 converts the signal light of the fundamental mode into a signal light of the $LP_{02}$ mode. The mode converters 407, 408 are, for example, long period fiber gratings. The few-mode fiber 322 or the single-mode fiber 330 connects the mode converters 407, 408 and is provided between the mode converters 407, 408. The few-mode fiber 322 to which bending is applied means a few-mode fiber including a bent portion 324 bent by one turn with an appropriate bending radius such that light of modes other than the $LP_{01}$ mode leaks out of the core and is removed from the core. The appropriate bending radius is determined according to the wavelength of the $LP_{01}$ mode light in the optical transmission system 301, and is, for example, 3 to 6 mm Even if light of modes other than the $LP_{02}$ mode is transmitted from the mode converter 304 to the transmission line 302 by the optical transmission systems 301B, 301C including the unnecessary mode removal device 406, the unnecessary mode removal device 406 removes the light of modes other than the $LP_{02}$ mode. Thus, crosstalk between the $LP_{02}$ mode and a mode other than the $LP_{02}$ mode in the transmission line 302 is suppressed, and signal processing in the receiver 306 is simplified.

In the optical transmission system 301, the channel is encoded on the light of the $LP_{02}$ mode by using the mode converter 304 that is configured to excite the light of the $LP_{02}$ mode. After transmission on the transmission line 302, the mode converter 305 is used to convert the light of the $LP_{02}$ mode into the light of the $LP_{01}$ mode, which is a fundamental mode, and input the light of the $LP_{01}$ mode to the receiver 306 which is a single-mode device. In digital signal processing, one signal ($x_1$) is restored using one received signal ($y_1$).

Figure 15:
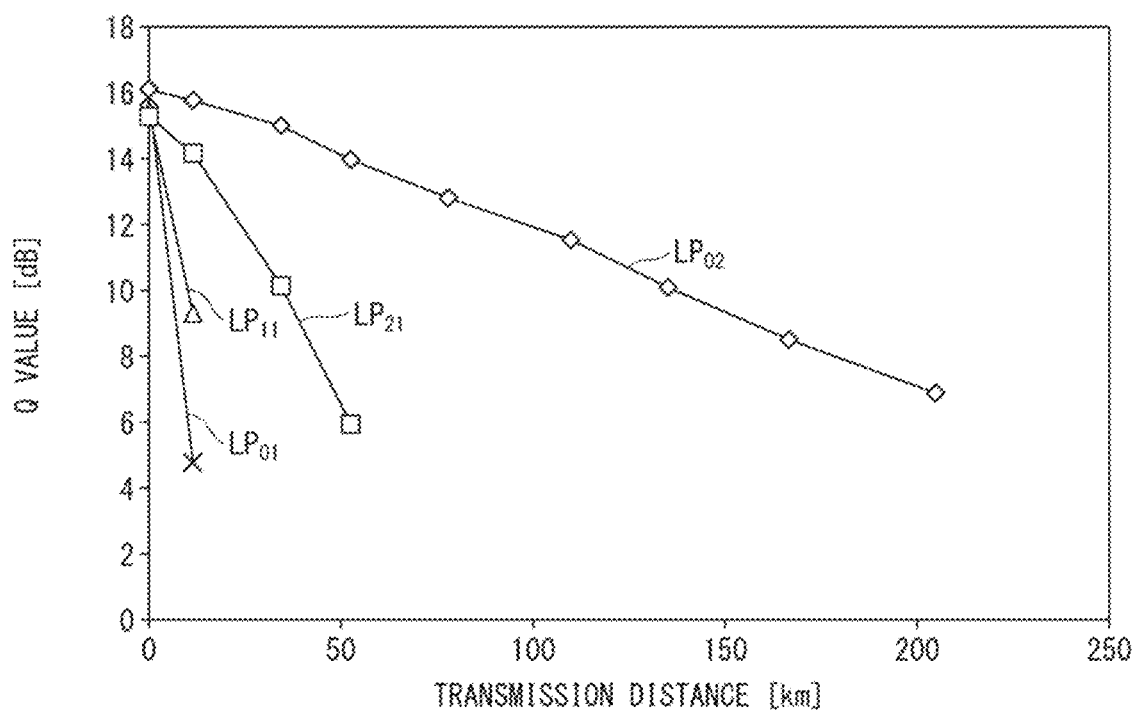
FIG. 15 is a graph showing a relationship between a transmission distance and a Q value when lights of an $LP_{01}$ mode, an $LP_{11}$ mode, an $LP_{21}$ mode, and an $LP_{02}$ mode are input to a prototyped optical fiber of the present invention.

FIG. 15 shows a relationship between the transmission distance and the signal quality (Q value) when lights of an $LP_{01}$ mode, an $LP_{11}$ mode, an $LP_{21}$ mode, and an $LP_{02}$ mode are input to the optical fiber of the present invention capable of satisfactorily propagating light of four LP modes. The transmitter 303 performs 40 Gbps quadrature phase shift keying (QPSK), and selectively excites each mode using a spatial mode multiplexer. The transmission line 302 is constituted by the prototyped optical fiber capable of successfully propagating four LP modes. The mode converter 305 is, for example, a spatial mode demultiplexer. The mode converter 305 converts each mode into a fundamental mode and demultiplexer it. The receiver 306 is, for example, a digital coherent receiver. In the receiver 306, digital data acquired by a real-time oscilloscope is taken into a personal computer, and a signal is demodulated by the DSP configured with a FIR filter in an off-line state. By performing demultiplexing with a high mode extinction ratio, it is possible to reduce the load on the DSP that compensates for crosstalk between modes. The number of taps of the FIR filter constituting the DSP is set to 40, which is the same level as that of the optical transmission system constituted by the single-mode fiber in the related art.

Figure 16:
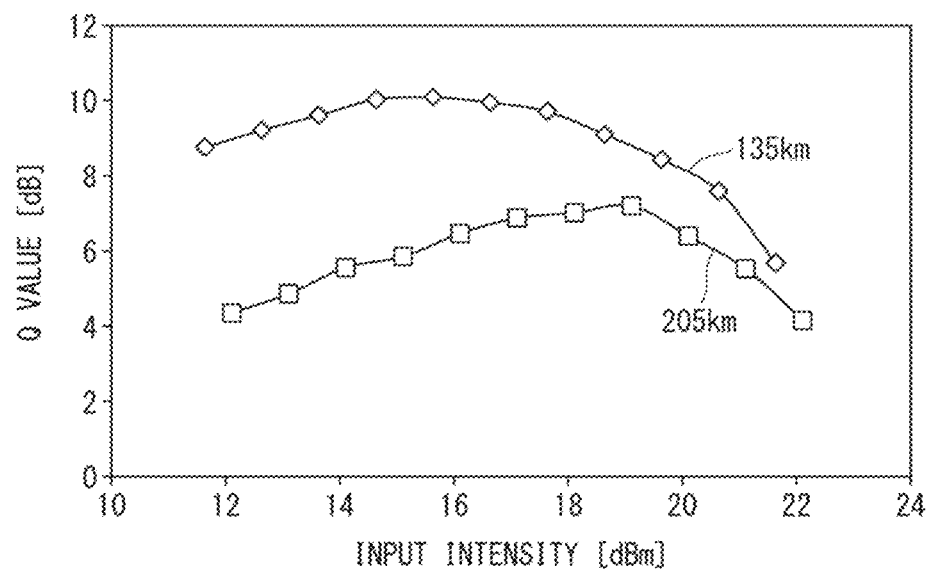
FIG. 16 is a graph showing a relationship between an input intensity and a Q value when the light of the $LP_{02}$ mode is input to the prototyped optical fiber of the present invention.

The $LP_{02}$ mode of the optical fiber capable of satisfactorily propagating four LP modes has a smaller Q value degradation with respect to the transmission distance than the other modes. This is because crosstalk between modes is reduced. As shown in FIG. 16, in a case where the length of the transmission line is 135 km, the signal quality deteriorates when the input intensity is 16 dBm or more. On the other hand, in a case where the length of the transmission line is 205 km, the signal quality deteriorates when the input intensity is 19 dBm or more. However, it is clear that the Q value of the $LP_{02}$ mode is better than the other modes even when the input intensity is changed.

As described above, in the second embodiment, an optical fiber capable of satisfactorily propagating $LP_{02}$ mode light is designed. In the second embodiment, using a mode multiplexer capable of selectively exciting modes, a signal is encoded on light of the propagation mode and propagated. Thus, the input intensity can be increased and the transmission distance can be extended. Signal quality and numerical values such as and Q value in the above description are based on experimental results at a wavelength of 1550 nm. However, the same effect as described above can be obtained even when light having a wavelength other than 1550 nm is used. Based on this point, the optical transmission system 301 may employ a wavelength division multiplexing technique.

Third Embodiment

Figure 17A:
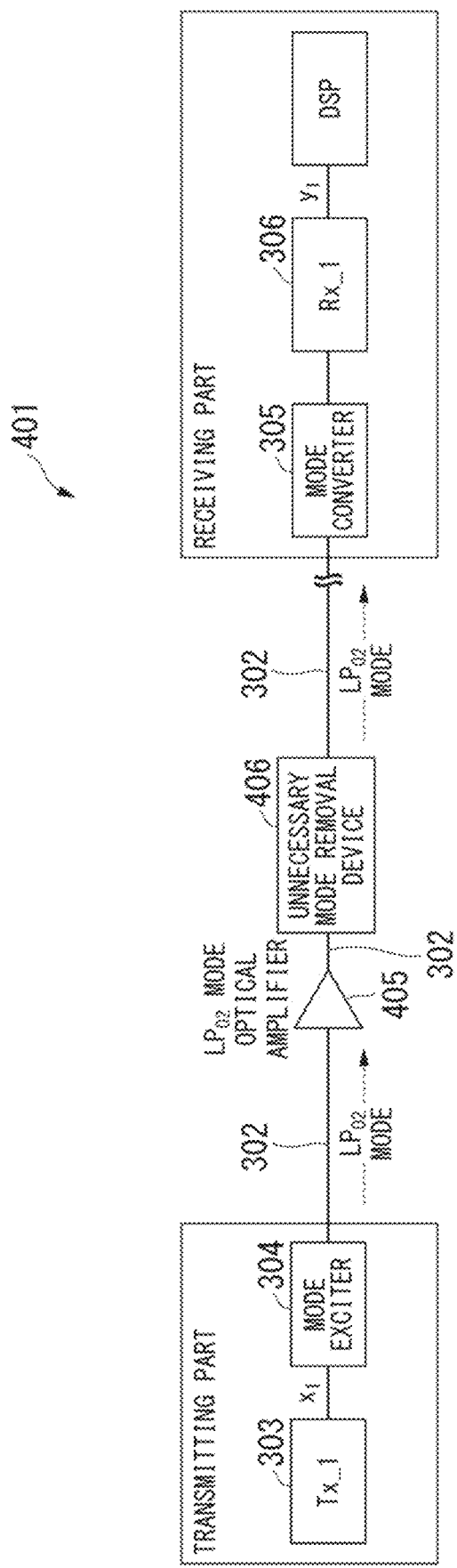
FIG. 17A is a diagram showing an optical transmission system including an optical fiber of the present invention which is optimally designed for the $LP_{02}$ mode as a transmission line.

An optical transmission system 401 shown in FIG. 17A includes a receiving part in which a plurality of receivers are connected in parallel. In FIG. 17, the components of the optical transmission system 401 similar to the components of the optical transmission system 301 described above are denoted by the same signs, and the description thereof is omitted. In addition to the configuration of the optical transmission system 301, the optical transmission system 401 further includes an optical amplifier (first amplifier) 405 that is configured to amplify the signal light excited to the $LP_{02}$ mode.

Figure 17B:
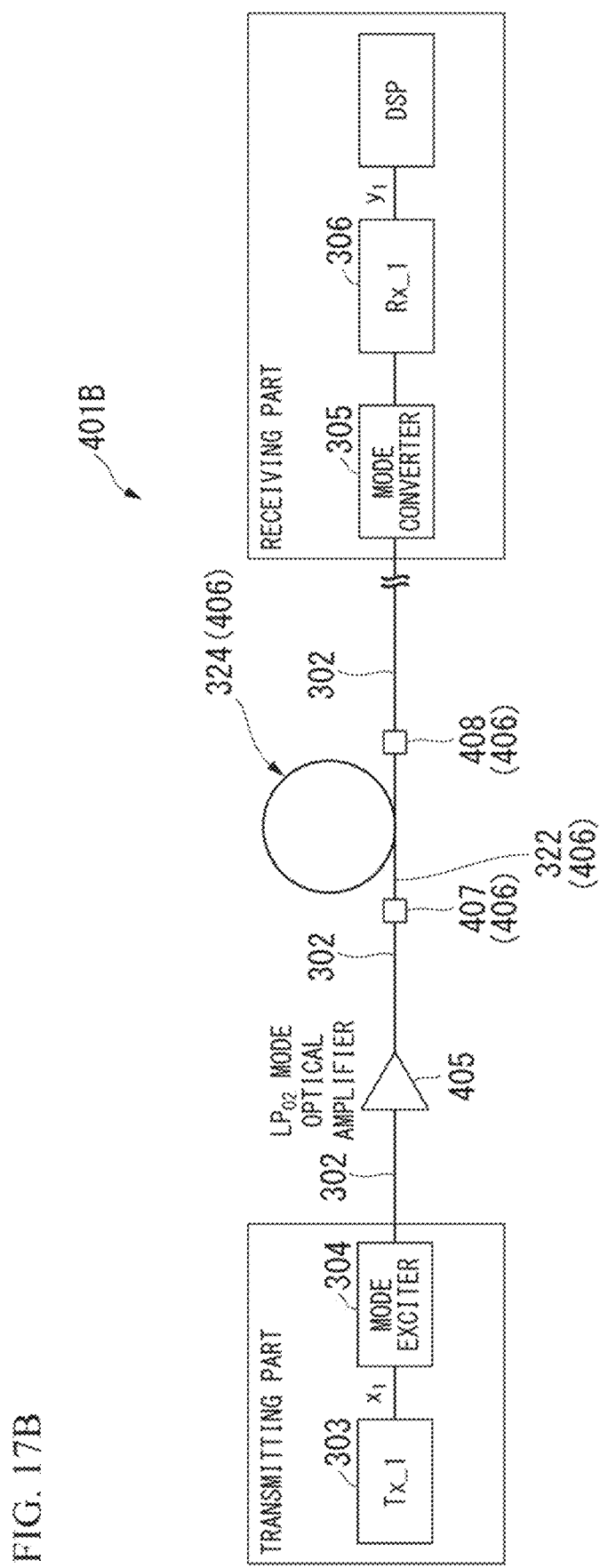
FIG. 17B is a diagram showing an optical transmission system including an optical fiber of the present invention which is optimally designed for the $LP_{02}$ mode as a transmission line.
Figure 17C:
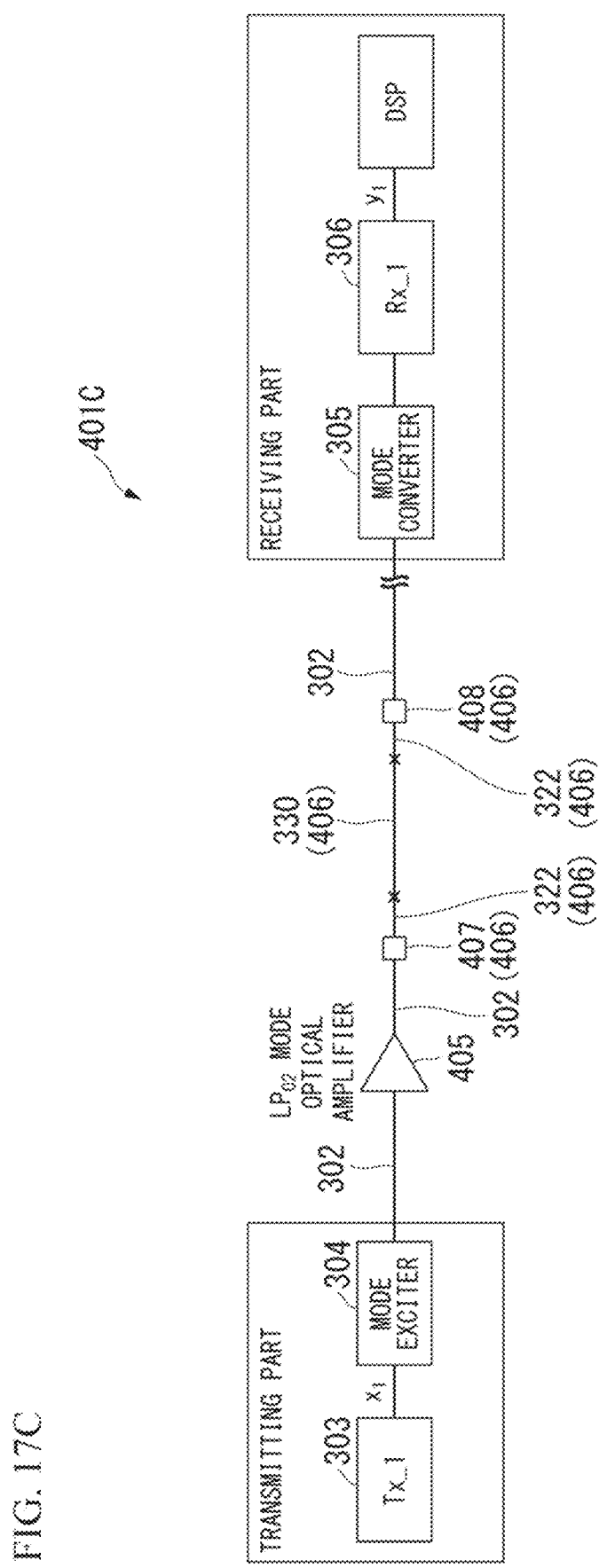
FIG. 17C is a diagram showing an optical transmission system including an optical fiber of the present invention which is optimally designed for the $LP_{02}$ mode as a transmission line.

In the optical transmission system 401, a signal is encoded on the light of the $LP_{02}$ mode using a mode exciter for the $LP_{02}$ mode. Using an optical amplifier capable of amplifying the light of the $LP_{02}$ mode, the intensity of the light of the $LP_{02}$ mode is amplified. ASE noise of modes other than the $LP_{02}$ mode is generated from the optical amplifier generates. Therefore, light of modes other than the $LP_{02}$ mode are removed by an unnecessary mode removal device 406 that removes light of unnecessary modes other than the $LP_{02}$ mode in the subsequent position of the optical amplifier 405. As shown in FIGS. 17B and 17C, an example of the unnecessary mode removal device 406, as described in the second embodiment, is a combination of the mode converter 407, the multi-mode fiber 322 to which bending is applied or a combination of the single-mode fiber 330 and the mode converter 408. The receiver 306 includes a mode converter and a single mode device. In digital signal processing, one signal ($x_1$) can be restored using the received signal ($y_1$).

According to the optical transmission systems 401, 401B, and 401C including the unnecessary mode removal device 406, crosstalk between the $LP_{02}$ mode and a mode other than the $LP_{02}$ mode in the transmission line 302 is suppressed, and signal processing in the receiver 306 is simplified.

Figure 18:
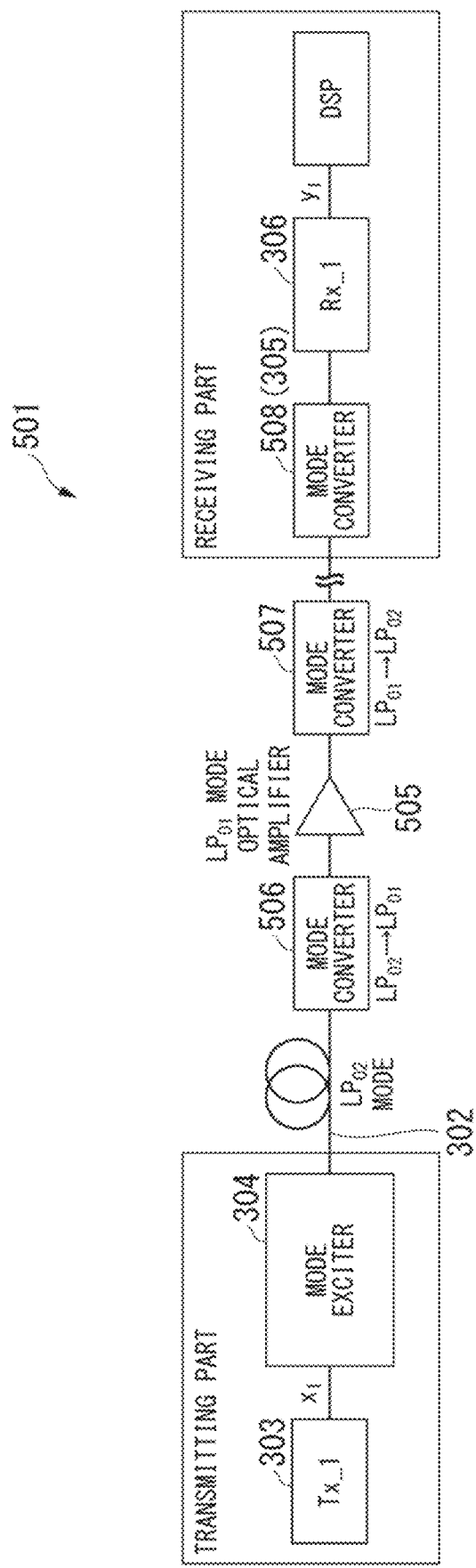
FIG. 18 is a diagram showing an optical transmission system of the present invention, which includes a mode converter and an amplifier when a signal is encoded on a light of $LP_{02}$ mode.

The optical transmission system 501 shown in FIG. 18 converts the light of the $LP_{02}$ mode into the light of the $LP_{01}$ mode, which is the fundamental mode, by the mode converter 305 in the optical relay. Thereafter, the optical transmission system 501 amplifies the light of the $LP_{01}$ mode by the optical amplifier for the $LP_{01}$ mode and then converts the light the $LP_{01}$ mode into light of the $LP_{02}$ mode. In FIG. 18, the same reference signs are given to the same components of the optical transmission system 501 as those of the optical transmission system 301 and the optical transmission system 401, and the description thereof is omitted.

As shown in FIG. 18, the optical transmission system 501 includes the transmission line 302, the transmitter 303, the mode converter 304, a mode converter (first mode converter) 506, an optical amplifier (second amplifier) 505, a mode converter (second mode converter) 507, a mode converter (third mode converter) 508, and the receiver 306. The mode converter 506 converts the linearly polarized mode of the signal light, which is excited to the $LP_{02}$ mode and output from the transmission line 302, into a fundamental mode. The optical amplifier 505 amplifies the signal light that is converted to the fundamental mode and output from the mode converter 506. The mode converter 507 excites a linearly polarized mode of the signal light of the fundamental mode amplified by the optical amplifier 505 to the $LP_{02}$ mode. The mode converter 508 converts the linearly polarized mode of the $LP_{02}$ mode signal light excited by the mode converter 507 into a fundamental mode. The receiver 306 receives the signal light of the fundamental mode converted by the mode converter 508.

In the optical transmission system 501, an existing amplifier for the $LP_{01}$ mode can be used. Therefore, an inexpensive optical transmission system 501 is provided. In the optical transmission system 501, since only the light of $LP_{02}$ mode is converted into the light of $LP_{01}$ mode, unnecessary modes before conversion such as the $LP_{11}$ mode and the $LP_{21}$ mode is not required.

Figure 19:
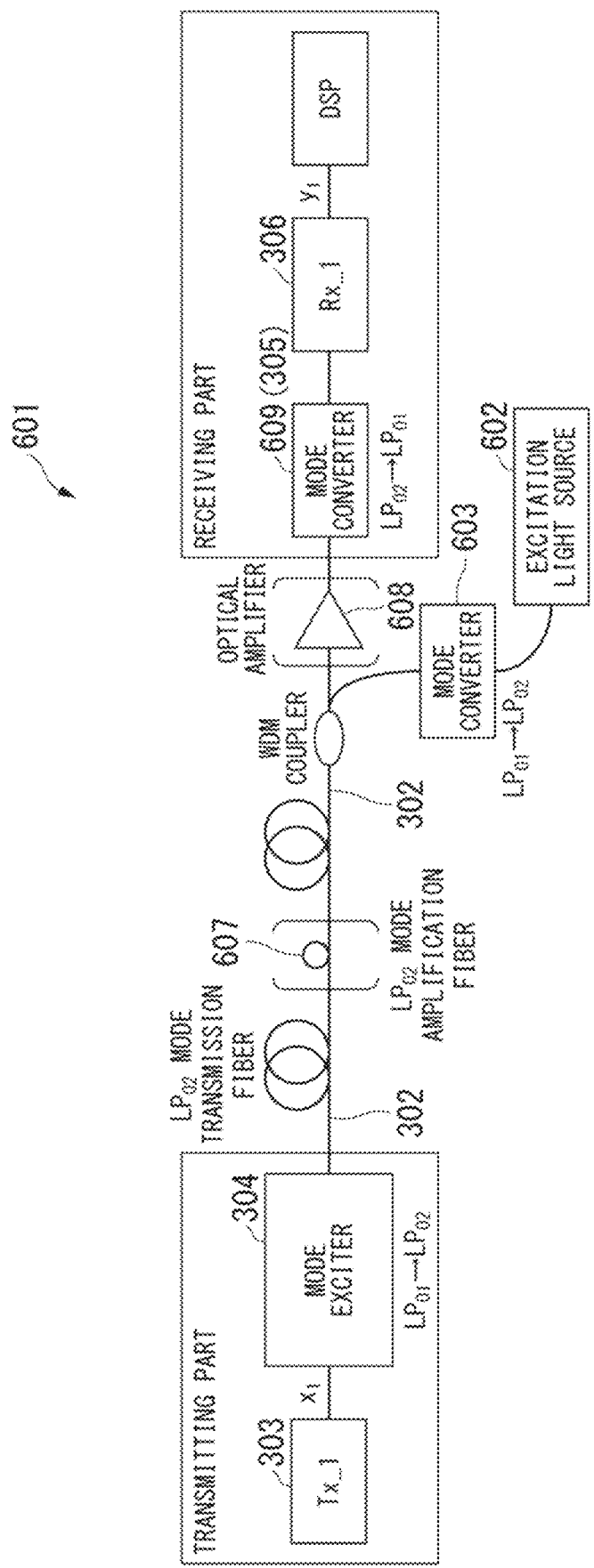
FIG. 19 is a diagram showing an optical transmission system of the present invention, which encodes a signal on a light of $LP_{02}$ mode and carries out Raman amplification of the light.

FIG. 19 shows an optical transmission system 601 using Raman amplification when a signal is encoded in the $LP_{02}$ mode. The optical transmission system 601 includes the transmission line 302, the transmitter 303, the mode converter 304, an excitation light source 602 for Raman amplification, a mode converter (fourth mode converter) 603, a WDM coupler (excitation light multiplexer) 605, a mode converter (fifth mode converter) 609, and the receiver 306. The mode converter 603 converts the linearly polarized mode of the excitation light output from the excitation light source 602 for Raman amplification into the $LP_{02}$ mode. The WDM coupler (excitation light multiplexer) 605 multiplexes the excitation light converted by the mode converter 603 to the transmission line 302. The mode converter 609 converts the linearly polarized mode of the $LP_{02}$ mode signal light output from the transmission line 302 into a fundamental mode.

In the optical transmission system 601 shown in FIG. 19, an erbium-doped optical fiber 607 (that is, an amplification fiber for $LP_{02}$ mode) is provided in the middle of the transmission line 302, and the excitation light source 602 for Raman amplification may be replaced with an excitation light source for an erbium-doped optical fiber. Further, an optical amplifier (third amplifier) 608 may be provided between the WDM coupler (excitation light multiplexer) 605 and the mode converter 305.

An amplifier for remote excitation is installed between the transmitter 303 and the receiver 306. The amplifier for remote excitation includes an excitation light source 602 for Raman amplification, an erbium-doped optical fiber, an optical amplifier 608, devices related thereto, and the like. By applying the remote excitation light amplification technique to the optical transmission system 601, long-distance transmission can be realized in a parasitic transmission system, so it is preferable to install an amplifier for remote excitation. The amplifier for remote excitation may not be necessarily installed. Here, the $LP_{02}$ mode is selectively used as a mode of excitation light incident from the transmission end or the reception end. The excitation light mode is preferably the $LP_{02}$ mode, but may be, for example, $LP_{01}$, $LP_{11}$, and $LP_{21}$ modes as other modes. FIG. 19 shows an example in which excitation light is incident from the subsequent position. Thus, further extension of transmission distance can be realized by using the remote excitation light amplification technique. The $LP_{02}$ mode amplifier, the mode converter, and the single-mode amplifier may be installed after the transmission line.

As described above, the optical transmission system according to the present invention carries a signal in modes with low loss, low nonlinearity, and low crosstalk, by using a step-index optical fiber of which transmission line is optimized to propagate an $LP_{02}$ mode, and mode multiplexer and demultiplexer with a high mode extinction ratio. Thus, long-distance and large-capacity transmission can be realized.

INDUSTRIAL APPLICABILITY

According to the present invention, it is possible to realize optical fiber transmission of a large capacity and long distance by utilizing a higher-order mode of the optical fiber.

REFERENCE SIGNS LIST

201 optical fiber
202 core
203 cladding
301, 301B, 301C, 401, 401B, 401C, 501, 601 optical transmission system
302 transmission line
303 transmitter
304 mode converter (mode exciter)
305 mode converter
306 receiver

What is claimed is:

1. An optical transmission system comprising:
a transmission line including an optical fiber;
a transmitter that is configured to output signal light;
a mode exciter that is configured to excite a linearly polarized mode of the signal light output from the transmitter to an $LP_{02}$ mode and input the excited signal light to the transmission line;
a first mode converter that is configured to convert the linearly polarized mode of the signal light, which is excited to the $LP_{02}$ mode and output from the transmission line, into a fundamental mode; and
a receiver that is configured to receive the signal light converted into the fundamental mode,
a second mode converter that is configured to convert the signal light of the $LP_{02}$ mode into the signal light of the fundamental mode as an unnecessary mode removal device that removes modes other than the $LP_{02}$ mode between the mode exciter and the first mode converter; and
a third mode converter that is configured to convert the signal light of the fundamental mode into the signal light of the $LP_{02}$ mode, and another optical fiber which connects the second mode converter and the third mode converter and to which bending is applied, or a single-mode fiber that connects the second mode converter and the third mode converter;
wherein the optical fiber is configured to propagate the signal light excited to the $LP_{02}$ mode;
wherein the optical fiber has a core; and a cladding that is provided on an outer periphery of the core and has a refractive index lower than a refractive index of the core,
wherein a V value representing a normalized frequency of an $LP_{02}$ mode is greater than or equal to 4.8 and less than or equal to 6.4.

2. The optical transmission system according to claim 1, wherein
the V value representing the normalized frequency of the $LP_{02}$ mode of the optical fiber is greater than or equal to 5.3 and less than or equal to 6.4,
an effective area of the optical fiber is greater than or equal to 150 $\mu m^2$,
a radius of the core is greater than or equal to 8.0 $\mu m$ and less than or equal to 13.4 $\mu m$, and
a relative refractive index difference of the optical fiber is greater than or equal to 0.33% and less than or equal to 0.55%.

3. The optical transmission system according to claim 1, further comprising:
an amplifier that is configured to amplify the signal light excited to the $LP_{02}$ mode.

4. An optical transmission system comprising:
a transmission line including an optical fiber;
a transmitter that is configured to output signal light;
a mode exciter that is configured to excite a linearly polarized mode of the signal light output from the transmitter to an $LP_{02}$ mode and inputs the excited signal light to the transmission line;
a first mode converter that is configured to convert the linearly polarized mode of the signal light, which is excited to the $LP_{02}$ mode and output from the transmission line, into a fundamental mode; and
an amplifier that is configured to amplify the signal light converted to the fundamental mode and output from the first mode converter;
a second mode converter that is configured to excite a linearly polarized mode of the signal light of the fundamental mode amplified by the amplifier to an $LP_{02}$ mode;
a third mode converter that is configured to convert the linearly polarized mode of the signal light of the $LP_{02}$ mode excited by the second mode converter into a fundamental mode; and
a receiver that is configured to receive the signal light of the fundamental mode converted by the third mode converter,
wherein the optical fiber is configured to propagate the signal light excited to the $LP_{02}$ mode,
wherein the optical fiber has a core; and a cladding that is provided on an outer periphery of the core and has a refractive index lower than a refractive index of the core, wherein a V value representing a normalized frequency of an $LP_{02}$ mode is greater than or equal to 4.8 and less than or equal to 6.4.

5. The optical transmission system according to claim 4, wherein the V value representing the normalized frequency of the $LP_{02}$ mode of the optical fiber is greater than or equal to 5.3 and less than or equal to 6.4, an effective area of the optical fiber is greater than or equal to 150 μm$^2$, a radius of the core is greater than or equal to 8.0 μm and less than or equal to 13.4 μm, and a relative refractive index difference of the optical fiber is greater than or equal to 0.33% and less than or equal to 0.55%.

6. An optical transmission system comprising:

a transmission line including an optical fiber;

a transmitter that is configured to output signal light;

a mode exciter that is configured to excite a linearly polarized mode of the signal light output from the transmitter to an $LP_{02}$ mode and input the excited signal light to the transmission line;

an excitation light source for Raman amplification;

a first mode converter that is configured to convert the linearly polarized mode of the excitation light output from the excitation light source for Raman amplification into the $LP_{02}$ mode;

an excitation light multiplexer that is configured to multiplex the excitation light converted by the first mode converter to the transmission line;

a second mode converter that is configured to convert the linearly polarized mode of the signal light output from the transmission line into a fundamental mode; and a receiver that is configured to receive the signal light converted into the fundamental mode by the second mode converter, wherein the optical fiber is configured to propagate the signal light excited to the $LP_{02}$ mode, wherein the optical fiber has a core; and a cladding that is provided on an outer periphery of the core and has a refractive index lower than a refractive index of the core, wherein a V value representing a normalized frequency of an $LP_{02}$ mode is greater than or equal to 4.8 and less than or equal to 6.4.

7. The optical transmission system according to claim 6, wherein an amplifier is provided between the excitation light multiplexer and the second mode converter.

8. The optical transmission system according to claim 6, wherein the V value representing the normalized frequency of the $LP_{02}$ mode of the optical fiber is greater than or equal to 5.3 and less than or equal to 6.4, a effective area of the optical fiber is greater than or equal to 150 μm$^2$, a radius of the core is greater than or equal to 8.0 μm and less than or equal to 13.4 μm, and a relative refractive index difference of the optical fiber is greater than or equal to 0.33% and less than or equal to 0.55%.

9. An optical transmission system comprising:

a transmission line including an optical fiber;

a transmitter that is configured to output signal light;

a mode exciter that is configured to excite a linearly polarized mode of the signal light output from the transmitter to an $LP_{02}$ mode and input the excited signal light to the transmission line;

an excitation light source;

a first mode converter that is configured to convert the linearly polarized mode of the excitation light output from the excitation light source into the $LP_{02}$ mode;

an excitation light multiplexer that is configured to multiplex the excitation light converted by the first mode converter to the transmission line;

an amplification fiber that is provided in the transmission line, and is configured to amplify the signal light excited by the excitation light in the mode exciter;

a second mode converter that is configured to convert the linearly polarized mode of the signal light output from the transmission line into a fundamental mode; and a receiver that is configured to receive the signal light converted into the fundamental mode by the second mode converter, wherein the optical fiber is configured to propagate the signal light excited to the $LP_{02}$ mode, wherein the optical fiber has a core; and a cladding that is provided on an outer periphery of the core and has a refractive index lower than a refractive index of the core, wherein a V value representing a normalized frequency of an $LP_{02}$ mode is greater than or equal to 4.8 and less than or equal to 6.4.

10. The optical transmission system according to claim 9, wherein an amplifier is provided between the excitation light multiplexer and the second mode converter.

11. The optical transmission system according to claim 9, wherein the V value representing the normalized frequency of the $LP_{02}$ mode of the optical fiber is greater than or equal to 5.3 and less than or equal to 6.4, a effective area of the optical fiber is greater than or equal to 150 μm$^2$, a radius of the core is greater than or equal to 8.0 μm and less than or equal to 13.4 μm, and a relative refractive index difference of the optical fiber is greater than or equal to 0.33% and less than or equal to 0.55%.

* * * * *